United States Patent
Edge

(10) Patent No.: US 10,051,684 B2
(45) Date of Patent: Aug. 14, 2018

(54) TRANSFER OF UNCOMPENSATED BAROMETRIC PRESSURE INFORMATION

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/860,452

(22) Filed: Sep. 21, 2015

(65) Prior Publication Data
US 2016/0330769 A1 Nov. 10, 2016

Related U.S. Application Data

(60) Provisional application No. 62/156,845, filed on May 4, 2015.

(51) Int. Cl.
*H04M 11/04* (2006.01)
*H04W 76/50* (2018.01)
(Continued)

(52) U.S. Cl.
CPC ............ *H04W 76/50* (2018.02); *H04L 12/66* (2013.01); *H04L 67/18* (2013.01); *H04M 1/72536* (2013.01); *H04W 4/02* (2013.01); *H04W 4/22* (2013.01); *H04W 4/90* (2018.02); *H04W 24/10* (2013.01); *H04W 76/007* (2013.01); *H04L 67/147* (2013.01); *H04L 67/28* (2013.01);
(Continued)

(58) Field of Classification Search
USPC .......................... 455/404.2, 456.3, 73, 456.1
See application file for complete search history.

(56) References Cited

U.S. PATENT DOCUMENTS 8,254,877 B2 8/2012 Edge et al.
8,990,043 B1 3/2015 Kolodziej
(Continued)

OTHER PUBLICATIONS

Winterbottom, J., Thomson, M., Barnes, R., Rosen, B., & George, R. (Jan. 15, 2013). Specifying Civic Address Extensions in the Presence Information Data Format Location Object (PIDF-LO) (No. RFC 6848). Internet Engineering Task Force (IETF), 1-21. ISSN: 2070-1721 XP015086534.
(Continued)

*Primary Examiner* — David Q Nguyen
(74) *Attorney, Agent, or Firm* — Hunter Clark PLLC

(57) ABSTRACT

Techniques for providing uncompensated barometric pressure (UBP) to a Public Safety Answering Point (PSAP) are disclosed. An example of an apparatus for providing UBP between a user equipment (UE) and the PSAP includes a location server and a gateway. The location server is configured to receive an uncompensated barometric pressure (UBP) from the UE, generate a civic or a geographic location record containing the UBP, and provide the civic or geographic location record containing the UBP to the gateway. The gateway is configured to receive the civic or geographic location record containing the UBP from the location server and either transfer the civic location record containing the UBP to the PSAP or extract the UBP from the civic or geographic location record, and provide the UBP separately to the PSAP.

23 Claims, 12 Drawing Sheets

(51) Int. Cl.
| | |
|---|---|
| H04W 4/90 | (2018.01) |
| H04L 12/66 | (2006.01) |
| H04W 4/02 | (2018.01) |
| H04W 4/22 | (2009.01) |
| H04L 29/08 | (2006.01) |
| H04W 24/10 | (2009.01) |
| H04W 76/00 | (2018.01) |
| H04M 1/725 | (2006.01) |
| H04M 3/51 | (2006.01) |
| H04W 88/16 | (2009.01) |
| H04L 29/06 | (2006.01) |

(52) U.S. Cl.
CPC ......... *H04L 69/08* (2013.01); *H04M 1/72572* (2013.01); *H04M 3/5116* (2013.01); *H04M 2250/12* (2013.01); *H04W 88/16* (2013.01)

(56) References Cited

U.S. PATENT DOCUMENTS

| | | | | |
|---|---|---|---|---|
| 9,161,196 | B2* | 10/2015 | Ballantyne | H04W 4/90 |
| 2010/0041418 | A1 | 2/2010 | Edge et al. | |
| 2010/0099433 | A1 | 4/2010 | Wigren | |
| 2010/0317317 | A1* | 12/2010 | Maier | H04W 64/00 |
| | | | | 455/404.2 |
| 2013/0083902 | A1* | 4/2013 | Goswami | H04W 4/029 |
| | | | | 379/37 |
| 2013/0203373 | A1 | 8/2013 | Edge | |
| 2013/0324154 | A1 | 12/2013 | Raghupathy et al. | |
| 2014/0018095 | A1* | 1/2014 | Parvizi | H04W 4/043 |
| | | | | 455/456.1 |
| 2014/0135040 | A1 | 5/2014 | Edge et al. | |
| 2014/0162693 | A1 | 6/2014 | Wachter et al. | |
| 2014/0200846 | A1 | 7/2014 | Wachter et al. | |
| 2015/0080016 | A1* | 3/2015 | Smith | H04L 65/1006 |
| | | | | 455/456.1 |
| 2015/0230057 | A1* | 8/2015 | Jiang | G01S 5/0263 |
| | | | | 455/404.2 |
| 2016/0047649 | A1* | 2/2016 | Edge | H04W 4/025 |
| | | | | 455/73 |
| 2016/0080910 | A1* | 3/2016 | Smith | H04W 64/00 |
| | | | | 455/456.3 |

OTHER PUBLICATIONS

3rd Generation Partnership Project (3GPP). (Oct. 3, 2014) Technical Specification Group Services and System Aspects, Location Services (LCS), Service description; Stage 1 (Release 12). pp. 1-50. Valbonne, France. Retrieved from http://www.3gpp.org/ftp/Specs/ 2014-12/Rel-12/22_series/ XP050906591.

Qualcomm Incorporated. (Apr. 11, 2015). Indoor Location Improvements for UTRA utilizing WiFi, BT and Barometric Pressure Measurements. pp. 1-4. Document for Discussion and Decision presented at 3rd Generation Partnership Project (3GPP) TSG-RAN WG1 Meeting, Belgrade, Serbia. Retrieved from http://www.3gpp. org/ftp/tsg_ran/WG1_RL1/TSGR1_80b/Docs/ XP050949886.

International Search Report and Written Opinion—PCT/US2016/ 025814—ISA/EPO—dated Jul. 7, 2016—18 pgs.

Federal Communications Commission, FCC 15-9. (Feb. 3, 2015). Fourth Report and Order in the Matter of Wireless E911 Location Accuracy Requirements, PS Docket No. 07-114, 116 pgs.

TeleCommuication Systems (TCS). (Feb. 23, 2015). "Indoor Location Challenges for 9-1-1: Is It Real? Innovation in Secure, Highly Reliable Communications," 44 pgs.

Open Mobile Alliance (Jan. 8, 2014). "LPP Extensions Specification," OMA-TS-LPPe-V1_0-20140108-C, V1.0, 282 pgs.

Sherry, R. (Mar. 28, 2015). "Analysis of Standards for Delivering Uncompensated Barometric Pressure to the PSAP," ELOC, WTSC 0051, 5 pgs.

Second Written Opinion from International Application No. PCT/ US2016/025814, dated Mar. 16, 2017, 11 pgs.

International Preliminary Report on Patentability—PCT/US2016/ 025814—International Search Authority—European Patent Office, Rijswijk, NL, dated Jun. 9, 2017.

* cited by examiner

TRANSFER OF UNCOMPENSATED BAROMETRIC PRESSURE INFORMATION

CROSS-REFERENCE TO RELATED APPLICATIONS

This application claims the benefit of U.S. Provisional Application No. 62/156,845, entitled "Transfer of Uncompensated Barometric Pressure Information," filed on May 4, 2015, which is assigned to the assignee hereof and the contents of which are incorporated herein by reference in their entirety.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as those from the Third Generation Partnership Project (3GPP) for Long Term Evolution (LTE), LTE Advanced (LTE-A), Universal Mobile Telecommunications System (UMTS), General Packet Radio Service (GPRS), Global System for Mobile Communications (GSM), etc.

Typically, a modern wireless communication system includes location capabilities to locate wireless terminals based on measurements by wireless terminals of received radio signals (e.g., signals from navigation satellites, base stations, access points) and possibly of other information (e.g. barometric air pressure). During emergency situations, a mobile device may be used to connect with a Public Safety Answering Point (PSAP), such as by dialing 911 or 112. A wireless communication system may provide location related information for a mobile device to assist a PSAP in routing appropriate resources and responding to an emergency call. The location related information may include certain measurements made by a mobile device such as a measurement of barometric pressure. Improvements in the ability of a mobile device or a network to provide location related information to a PSAP may lead to decreased response times for emergency personnel.

SUMMARY

An example of a method for providing uncompensated barometric pressure information to a Public Safety Answering Point (PSAP) according to the disclosure includes obtaining a dispatchable civic location for a user equipment, obtaining an uncompensated barometric pressure (UBP) from the user equipment, combining the UBP with the dispatchable civic location, and sending the UBP and the dispatchable civic location to the PSAP.

Implementations of such a method may include one or more of the following features. The UBP and the dispatchable civic location may be obtained by a location server. The location server may be one of an Enhanced Serving Mobile Location Center (E-SMLC), an Emergency Secure Location User Plane Location (SUPL) Location Platform (E-SLP), or a Standalone Serving Mobile Location Center (SAS). The UBP may be obtained from the user equipment via at least one of a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The dispatchable civic location may include a Presence Information Data Format Location Object (PIDF-LO). The PIDF-LO may be obtained from a National Emergency Address Database (NEAD). Providing the UBP and the dispatchable civic location to the PSAP may include providing the UBP and the dispatchable civic location to a gateway via at least one of a 3GPP Iupc, Iu-cs, Iu-ps, SLs, SLg, Lg, Lgd, or L0 interface, and providing at least the UBP to the PSAP from the gateway via at least one of an HTTP Enabled Location Delivery (HELD) protocol, an OMA Mobile Location Protocol (MLP), or a TIA/ATIS J-STD-036 E2 protocol.

An example of an apparatus for providing uncompensated barometric pressure between a user equipment (UE) and a Public Safety Answering Point (PSAP) according to the disclosure includes a location server and a gateway each comprising at least one processor and memory. The location server is configured to obtain an uncompensated barometric pressure (UBP) from the UE, generate a civic location record containing the UBP, and provide the civic location record containing the UBP to the gateway. The gateway is configured to obtain the civic location record containing the UBP from the location server, extract the UBP from the civic location record, and provide the UBP to the PSAP.

Implementations of such an apparatus may include one or more of the following features. The location server may be one of an Enhanced Serving Mobile Location Center (E-SMLC), an Emergency Secure Location User Plane Location (SUPL) Location Platform (E-SLP), or a Standalone Serving Mobile Location Center (SAS). The location server may be configured to provide the gateway via at least one of a 3GPP SLs, SLg, L0, Lg, Lgd, Iupc, Iu-cs or Iu-ps interface. The location server may be further configured to generate an empty civic location record, combine the empty civic location record and the UBP, and provide the empty civic location record and UBP to the gateway. The UBP may be obtained from the UE via at least one of a OMA LTE Positioning Protocol Extensions (LPPe), a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The gateway may be configured to provide the UBP to the PSAP via an HTTP Enabled Location Delivery (HELD) protocol, the OMA Mobile Location Protocol (MLP) or a TIA/ATIS J-STD-036 E2 protocol, or combination thereof. The gateway may be further configured to provide the civic location record to the PSAP.

An example of an apparatus for providing uncompensated barometric pressure (UBP) between a user equipment (UE) and a Public Safety Answering Point (PSAP) according to the disclosure includes means for determining a location information for the UE, means for receiving the UBP from the UE, means for combining the UBP with the location information, means for providing the UBP and the location information to a gateway, means for extracting the UBP from the location information, and means for providing the UBP to the PSAP.

Implementations of such an apparatus may include one or more of the following features. The means for receiving the UBP from the UE may include at least one of a OMA LTE Positioning Protocol Extensions (LPPe), a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The means for providing the UBP and the location information to the gateway may include at least one of a 3GPP SLs, SLg, L0, Lg, Lgd, Iupc, Iu-cs or Iu-ps interface. The means for determining the location information for the UE may include a SPS receiver. The means for providing the UBP to the PSAP includes at least one of a HELD, MLP or E2 protocol. The means for combining the UBP with the location information may include concatenating a geographic location string with a data field of two additional octets representing the UBP.

An example of a non-transitory processor-readable storage medium according to the disclosure includes instructions for providing uncompensated barometric pressure information to a Public Safety Answering Point (PSAP), the instructions including code for receiving an uncompensated barometric pressure (UBP) from a user equipment, code for receiving a dispatchable civic location for the user equipment, code for combining the UBP with the dispatchable civic location, and code for sending the UBP and the dispatchable civic location to the PSAP.

Implementations of such a non-transitory processor-readable storage medium may include one or more of the following features. Code for receiving the UBP and the dispatchable civic location with a location server. The location server may be one of an Evolved Serving Mobile Location Center (E-SMLC), an Emergency Secure User Plane Location (SUPL) Location Platform (E-SLP), or a Standalone Serving Mobile Location Center (SAS). Code for receiving the UBP from the user equipment may be configured to obtain the UBP via at least one of a OMA LTE Positioning Protocol Extensions (LPPe), a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The dispatchable civic location may include a Presence Information Data Format Location Object (PIDF-LO), and the PIDF-LO may be obtained from a National Emergency Address Database (NEAD). The code for sending the UBP and the dispatchable civic location to the PSAP may include code for providing the UBP and the dispatchable civic location to a gateway via at least one of a 3GPP Iupc, Iu-cs, Iu-ps, SLs, SLg, Lg, Lgd, or L0 interface, and code for providing at least the UBP to the PSAP from the gateway via at least one of a HELD, MLP or E2 protocol.

An example of a gateway for providing uncompensated barometric pressure between user equipment (UE) and a Public Safety Answering Point (PSAP) according to the disclosure includes a network interface configured to obtain a dispatchable civic location record containing an uncompensated barometric pressure (UBP), a processor and memory configured to extract the UBP from the dispatchable civic location record, and the network interface is further configured to provide the UBP to the PSAP.

Implementations of such a gateway may include one or more of the following features. The network interface may be configured to provide the UBP to the PSAP via an HTTP Enabled Location Delivery (HELD) protocol, the OMA Mobile Location Protocol (MLP) or a TIA/ATIS J-STD-036 E2 protocol or combination thereof. The network interface may be further configured to provide the dispatchable civic location record to the PSAP.

An example of a location server for providing uncompensated barometric pressure for a user equipment (UE) to a gateway according to the disclosure includes a network interface configured to obtain an uncompensated barometric pressure (UBP) from the UE and obtain a dispatchable civic location for the UE, a processor and a memory configured to combine the UBP with the dispatchable civic location to generate a dispatchable civic location record containing the UBP, and the network interface further configured provide the dispatchable civic location record containing the UBP to the gateway.

Implementations of such a location server may include one or more of the following features. The location server may be one of an Evolved Serving Mobile Location Center (E-SMLC), an Emergency Secure User Plane Location (SUPL) Location Platform (E-SLP), or a Standalone Serving Mobile Location Center (SAS). The network interface may be configured to provide the dispatchable civic location record containing the UBP to the gateway via at least one of a 3GPP SLs, SLg, L0, Lg, Lgd, Iupc, Iu-cs or Iu-ps interface. The processor and the memory may be configured to generate an empty civic location record and combine the empty civic location record and the UBP, and the network interface may be further configured to provide the empty civic location record and UBP to the gateway. The UBP may be obtained from the UE via at least one of a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol.

An example of a method for providing uncompensated barometric pressure from a user equipment (UE) to a gateway in a Long Term Evolution (LTE) architecture or a Universal Mobile Telecommunication System (UMTS) architecture according to the disclosure includes obtaining an uncompensated barometric pressure (UBP) from the UE, obtaining a dispatchable civic location for the UE, combining the UBP with the dispatchable civic location to generate a dispatchable civic location record containing the UBP, and providing the dispatchable civic location record containing the UBP to the gateway.

Implementations of such a method may include on or more of the following features. The UBP and the dispatchable civic location may be obtained via one of an Enhanced Serving Mobile Location Center (E-SMLC), an Emergency Secure User Plane Location (SUPL) Location Platform (E-SLP), or a Standalone Serving Mobile Location Center (SAS). Providing the dispatchable civic location record containing the UBP to the gateway may be via at least one of a 3GPP SLs, SLg, L0, Lg, Lgd, Iupc, Iu-cs or Iu-ps interface. Obtaining the dispatchable civic location may include generating an empty civic location record, combining the empty civic location record and the UBP, and providing the empty civic location record containing UBP to the gateway. The UBP may be obtained from the UE via at least one of a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The UBP may be extracted from the dispatchable civic location record and provided to a Public Safety Answering Point (PSAP). The UBP may be provided to the PSAP via an HTTP Enabled Location Delivery (HELD) protocol, an OMA Mobile Location Protocol (MLP) or a TIA/ATIS J-STD-036 E2 protocol or combination thereof. The dispatchable civic location record may be provided to the PSAP.

Items and/or techniques described herein may provide one or more of the following capabilities, as well as other capabilities not mentioned. A mobile device (e.g., user equipment (UE)) may capture uncompensated barometric pressure information (UBP). A mobile device user may initiate an emergency call. The UBP is provided to a serving core network. Dispatchable civic location information based on the current location of the UE may be obtained. The current geographic location of the UE may be determined A location server combines the UBP with the dispatchable civic location information and/or the geographic location. The UBP is transferred through a communication network using existing interfaces and protocols. The UBP is provided to a Public Safety Answering Point (PSAP). Federal mandates are satisfied with minimal reconfiguration of existing network infrastructure. Further, it may be possible for an effect noted above to be achieved by means other than that noted, and a noted item/technique may not necessarily yield the noted effect.

Figure 1:
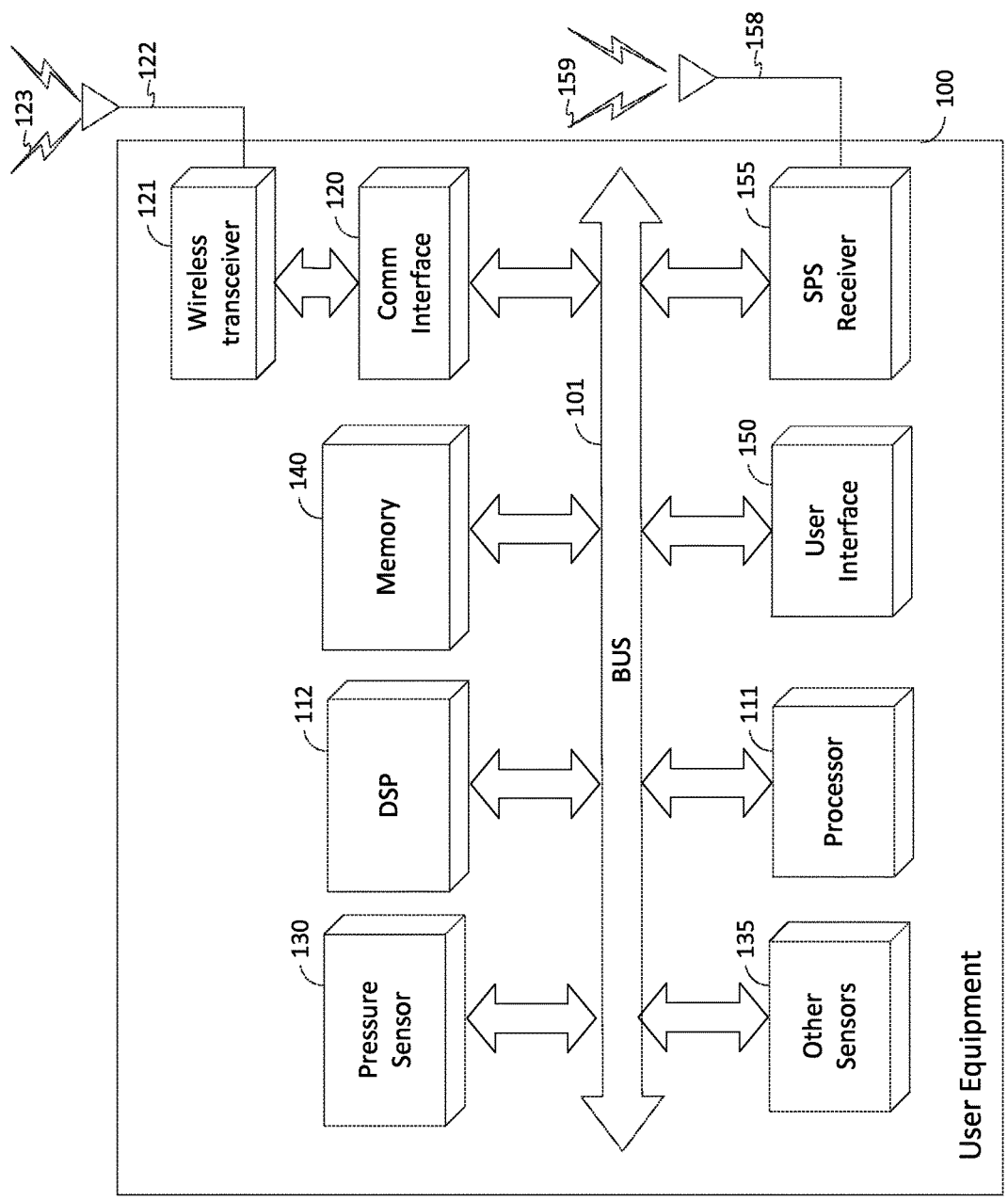
FIG. 1 is a block diagram of components of one embodiment of a user equipment.

Like numbered entities in different figures refer to corresponding entities—e.g. the same entities.

DETAILED DESCRIPTION

In the United States, the Federal Communications Commission (FCC) is mandating that network operators transfer a measurement of uncompensated barometric pressure (UBP) when a device capable of measuring UBP makes an emergency 911 call. The FCC is also mandating that network operators provide Heightened Accuracy Location Information (HALI) for emergency calls made indoors in the form of either a dispatchable civic location for an emergency caller or a geographic location accurate to 50 meters horizontally for an emergency caller when an emergency 911 call is placed from a wireless device. The usefulness of UBP to the public safety side may be less than the usefulness of either a civic location or geographic location since UBP needs to be converted into a corresponding altitude (e.g. a building floor level) which may not always be feasible, reliable or accurate. In addition, UBP may be replaced in a few more years by operators providing an altitude coordinate to a Public Safety Answering Point (PSAP). Hence, there may be a reluctance on the part of network operators to invest too heavily in supporting UBP—for example, by modifying existing protocols to support the transfer of UBP information across intervening control plane and/or user plane interfaces from a wireless device to a PSAP. For example, support of UBP information transfer may require modification to existing protocols and interfaces for Long Term Evolution (LTE), Universal Mobile Telecommunications Systems (UMTS), and for access to National Emergency Number Association (e.g., NENA i3) capable PSAPs as well as to legacy PSAPs. The low expected usefulness of including UBP information for emergency 911 calls may not justify high standards and implementation impacts to the existing protocols and interfaces.

Techniques are discussed herein for more efficiently providing uncompensated barometric pressure (UBP) information to a PSAP. UBP information may be provided by a mobile device (e.g. user equipment (UE)) to a location server (e.g., an Enhanced Serving Mobile Location Center (E-SMLC) or Emergency Secure User Plane Location (SUPL) Location Platform (E-SLP)) using a positioning protocol (e.g., the LTE Positioning Protocol (LPP) defined by 3GPP or the LPP Extensions (LPPe) protocol defined by the Open Mobile Alliance (OMA)). The UBP may be supported in units of Pascal (Pa), millibars or inches of Mercury etc. For example, in LPPe, units of Pa are used with a range of 30,000 to 115,000 Pa which is generally considered sufficient to represent any likely indoor or outdoor pressure at any likely altitude. It may be possible to provide such UBP information to a PSAP, however, many interfaces and protocols supported by existing serving networks could need to be extended to support the transfer. Rather than implement such changes across a network, one way to improve the efficiency of conveying UBP information would be to combine the UBP with some other heightened accuracy location information (HALI) content. For example, UBP may be combined with a dispatchable civic location (e.g. a street address or building designation) or with a geographic location that may include horizontal coordinates (e.g. latitude and longitude) and possibly an altitude, an uncertainty and/or a confidence level. This combination may avoid the need to standardize and implement separate UBP parameters for each affected protocol and interface within a communications network.

Referring to FIG. 1, a user equipment (UE) 100 is illustrated for which various techniques herein can be utilized. The UE 100 is generally a mobile device and can include or implement the functionality of various mobile communication and/or computing devices; examples include, but are not limited to, cellphones, personal digital assistants (PDAs), smartphones, computing devices such as laptops, desktops or tablet computers, automobile computing systems, etc., whether presently existing or developed in the future. The UE 100 may also be referred to as a mobile station, a mobile device, a terminal, a wireless terminal, a wireless device, an access terminal, a subscriber unit, a station, or by some other name.

The UE 100 includes a processor 111 (or processor core) and memory 140. The UE 100 may optionally include a trusted environment operably connected to the memory 140 by the public bus 101 or a private bus (not shown). The UE 100 may also include a communication interface 120 and a wireless transceiver 121 configured to send and obtain wireless signals 123 via a wireless antenna 122 over a wireless network. The wireless transceiver 121 is connected to the bus 101 via the communication interface 120. Here, the UE 100 is illustrated as having a single wireless transceiver 121. However, a UE 100 can alternatively have multiple wireless transceivers 121 and/or multiple wireless antennas 122 to support multiple communication standards such as WiFi (e.g. IEEE 802.11), CDMA, Wideband CDMA (WCDMA), Long Term Evolution (LTE), Bluetooth®, short-range wireless communication technology, etc.

The communication interface 120 and/or wireless transceiver 121 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The UE 100 may also include a user interface 150 (e.g., display, keyboard, touchscreen, microphone, speaker), and an SPS receiver 155 that receives satellite positioning system (SPS) signals 159 (e.g., from SPS satellites) via an SPS antenna 158 (e.g. which may be the same as or different to wireless antenna 122). The SPS receiver 155 can communicate with a single global navigation satellite system (GNSS) or multiple such systems. A GNSS can include, but is not limited to, the Global Positioning System (GPS), Galileo, Glonass, Beidou (Compass), etc. SPS satellites are also referred to as satellites, space vehicles (SVs), etc. The SPS receiver 155 processes, in whole or in part, the SPS signals 159 and may use these SPS signals 159 to determine the location of the UE 100 or may enable UE 100 to transfer measurements of the SPS signals to a location server (e.g. an E-SMLC or E-SLP) which computes a location for UE 100 from the measurements. The processor 111, memory 140, Digital Signal Processor (DSP) 112 and/or specialized processor(s) (not shown) may also be utilized to process the SPS signals 159, in whole or in part, and/or to calculate the location of the UE 100, in conjunction with SPS receiver 155. Storage of information from the SPS signals 159 or other location signals is performed using a memory 140 or registers (not shown). While only one processor 111, one DSP 112 and one memory 140 are shown in FIG. 1, more than one of any, a pair, or all of these components could be used by the UE 100. The processor 111 and DSP 112 associated with the UE 100 are connected to the bus 101.

The memory 140 can include a non-transitory computer-readable storage medium (or media) that stores functions as one or more instructions or code. Media that can make up the memory 140 include, but are not limited to, RAM, ROM, FLASH, disc drives, etc. In general, the functions stored by the memory 140 are executed by general-purpose processor(s) 111, specialized processors, or DSP(s) 112. Thus, the memory 140 is a processor-readable memory and/or a computer-readable memory that stores software (programming code, instructions, etc.) configured to cause the processor(s) 111 and/or DSP(s) 112 to perform the functions described. Alternatively, one or more functions of the UE 100 may be performed in whole or in part in hardware.

The terms location, position, location estimate and position estimate are used interchangeably herein to refer to a location which may be geographic (also referred to as geodetic) or civic. A geographic location for a UE 100 may include coordinates such as a latitude, longitude and possibly altitude (e.g. above or below mean sea level or above or below local ground level) or local coordinates (e.g. local X,Y,Z Cartesian coordinates) defined relative to some nearby fixed point. A civic location (also referred to as a civic address) for a UE 100 may include a postal address, street address, a name of a well known place or building, a reference to part of a building or structure (e.g. a floor level, room number, apartment number, gate number for an airport). A geographic location and a civic location for a UE 100 may refer to the same location for the UE 100 but may be expressed in different ways. In the case of an emergency call from a UE 100 to a PSAP, a civic location for the UE 100 may be referred to as a dispatchable civic location or as a dispatchable location and may be used by the PSAP to dispatch public safety responders to the location of the UE 100.

A UE 100 may estimate its current position, or obtain information that can be used by another entity such as a location server (e.g. an E-SMLC or E-SLP) to estimate the location of the UE 100, using various techniques, based on other communication entities within view and/or information available to the UE 100. For instance, a UE 100 can estimate its position or enable another entity to estimate the position of UE 100 using information obtained from nearby access points (APs) associated with one or more wireless local area networks (WLANs), personal area networks (PANs) utilizing a short-range wireless communication technology such as Bluetooth or ZIGBEE®, etc., a Global Navigation Satellite System (GNSS) or other Satellite Positioning System (SPS) satellites, and/or map data obtained from a map server. In some cases, a location server, which may be an E-SMLC, E-SLP or Standalone Serving Mobile Location Center (SAS), may provide assistance data to a UE 100 to enable or assist the UE 100 to make location related measurements (e.g. measurements of WLAN APs, cellular base stations, GNSS satellites). The UE 100 may then provide the measurements to the location server to compute a location estimate or may compute a location estimate itself based on the measurements and possibly based also on other assistance data provided by the location server (e.g. such as orbital and timing data for GNSS satellites or the precise location coordinates of WLAN APs and/or cellular base stations).

A pressure sensor 130 may be included within the UE 100 (e.g., internally) or may be operably coupled to the UE 100 as a peripheral device (e.g., externally). The pressure sensor 130 is configured to provide barometric pressure information (e.g., 10-1200 mbar) to the processor(s) 111. Examples pressure sensors may include Measurement Specialties MS5607, Bosch BMP085 or BMP280, and STMicroelectronics LPS22HB or LSP331AP. These examples are not limitations as other such piezo-resistive pressure sensors configured to detect atmospheric pressure may be used. The pressure sensor 130 is configured to detect ambient barometric pressure and the UE 100 may provide such uncompensated barometric pressure (UBP) information to a communications system (e.g. a location server such as an E-SMLC, E-SLP or SAS). The terms barometric pressure, barometric air pressure and atmospheric pressure are used interchangeably herein to refer to atmospheric pressure—e.g. at the location of the UE 100. The term UBP refers to a measurement of atmospheric pressure by a UE (e.g. by the UE 100 using the pressure sensor 130) in which the pressure measurement is not necessarily adjusted by the UE to compensate for any errors in the measurement.

Figure 2:
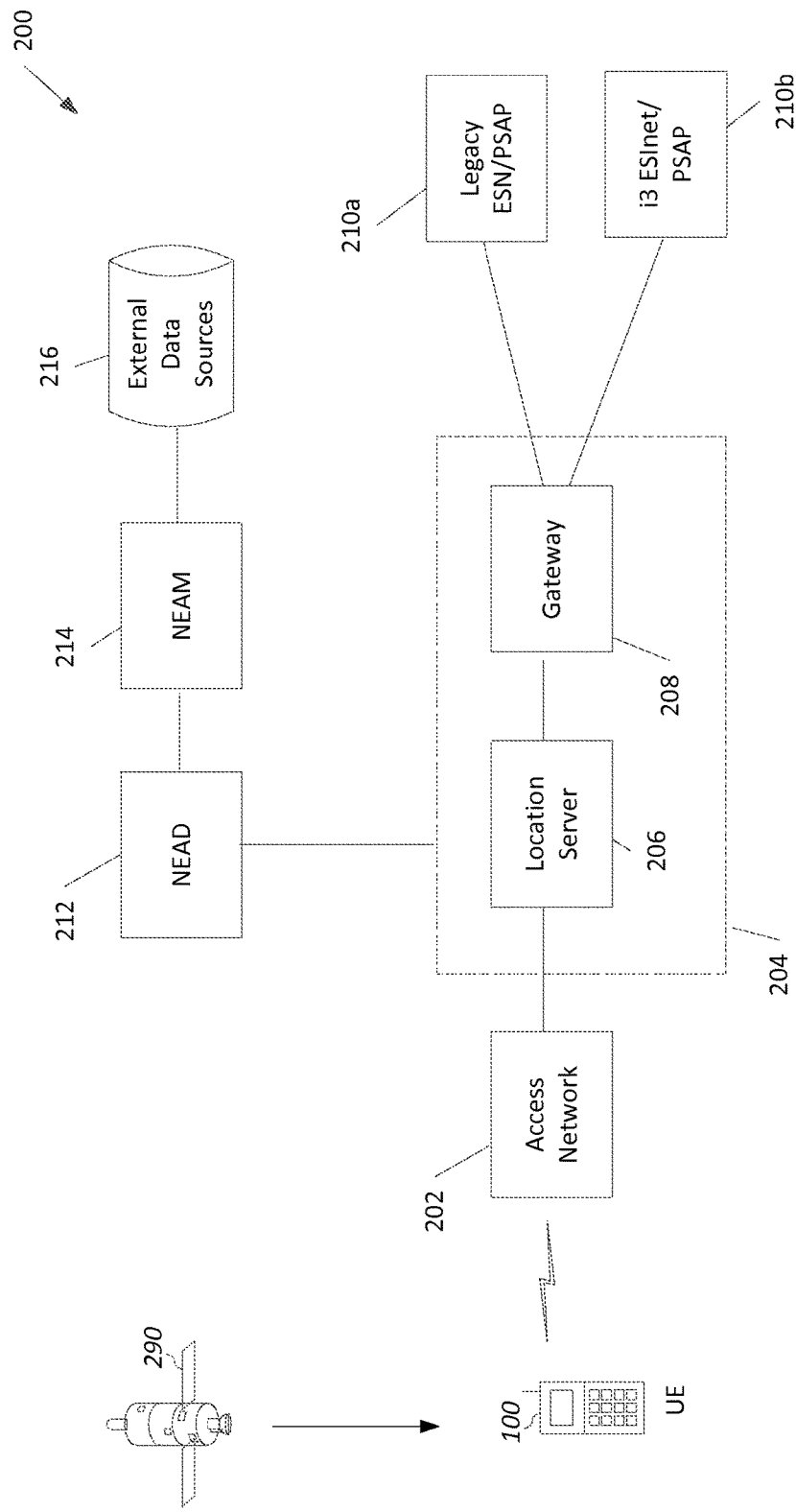
FIG. 2 is a high level architecture of an example wireless communication system for transferring uncompensated barometric pressure (UBP) information.

Referring to FIG. 2, with further reference to FIG. 1, an example communication system 200 for transferring uncompensated barometric pressure (UBP) information is shown. A UE 100 may communicate with an access network 202 to obtain communication services. The UE 100 may communicate with one or more base stations and/or one or more access points in access network 202. The UE 100 may also receive signals from one or more satellites 290, which may be part of the United States Global Positioning System (GPS), the European Galileo system, the Russian GLONASS system, etc. The UE 100 may measure signals from base stations and/or APs in access network 202 and obtain measurements of signal timing, signal strength and/or signal quality for the base stations and/or APs. The UE 100 may also measure signals from satellites 290 and obtain pseudo-range (or code phase or carrier phase) measurements for the satellites. The pseudo-range measurements and/or timing measurements may be used to derive a position estimate for UE 100 either by the UE 100 or by location server 206. The UE 100 is also configured to provide uncompensated barometric pressure (UBP) information to the location server 206 (e.g. as measured by pressure sensor 130).

The access network 202 provides radio communication for UEs located within its coverage area. The access network 202 may also be referred to as a radio network, a radio access network (RAN), etc. The access network 202 may include base stations, access points, network controllers, and/or other entities, as described below. A serving core network 204, which may be referred to as a core network or evolved packet core (EPC), may include network entities that may support various communication services. A location server 206 may support location services for UEs communicating with serving core network 204 (e.g., including UEs roaming to serving core network 204) and may or may not require the UEs to have any service subscription or any prior relationship to the location server 206. The serving core network 204 may also include a Gateway 208 configured to support messaging with PSAPs such as a legacy Emergency Services Network (ESN)/PSAP 210a and an i3 Emergency Services IP network (ESInet)/PSAP 210b.

Location server 206 may correspond to an E-SMLC, E-SLP or SAS and may support a control plane location solution (e.g. if location server 206 is an E-SMLC or SAS) or a user plane location solution such as the Open Mobile Alliance (OMA) SUPL solution (e.g. if location server 206 is an E-SLP). Location server 206 may interact with UE 100 to (i) transfer assistance data to UE 100 to assist UE 100 to make location related measurements and/or compute a location estimate from such measurements, (ii) request location related measurements and/or a location estimate from UE 100 and/or (iii) receive location related measurements and/or a location estimate from UE 100. Location server 206 may compute a location estimate (e.g. latitude, longitude and possibly altitude) for UE 100 from location related measurements received from UE 100. Location server 206 may interact with UE 100 using one or more of a number of different positioning protocols including (i) the LTE Positioning Protocol (LPP) defined by 3GPP, (ii) the LPP Extensions (LPPe) protocol defined by OMA, (iii) the Positioning Calculation Application Part (PCAP) plus Radio Resource Control (RRC) protocols for UMTS defined by 3GPP, (iv) the SUPL UserPlane Location Protocol (ULP) defined by OMA, and (v) the LTE Positioning Protocol A (LPPa) plus RRC protocol for LTE defined by 3GPP. For example, UE 100 and location server 206 may interact using LPP combined with LPPe when location server is an E-SMLC or E-SLP. The use of LPP combined with LPPe may be referred to as LPP/LPPe and may include transferring LPP messages where each LPP message embeds a single LPPe message—e.g. as defined for LPP in 3GPP TS 36.355.

Gateway 208 may correspond to a Gateway Mobile Location Center (GMLC) or Location Retrieval Function (LRF) as defined by 3GPP (e.g. in 3GPP Technical Specifications (TSs) 23.167 and 23.271) and may instigate positioning of UE 100 via location server 206—e.g. when Gateway 208 receives a location request for UE 100 from legacy ESN/PSAP 210a or i3 ESInet/PSAP 210b. Gateway 208 may then receive location information for UE 100 (e.g. HALI that may comprise a dispatchable civic location and/or a geographic location) via one or more intermediate entities in serving core network from location server 206 or directly from location server 206 and may send the location information to legacy ESN/PSAP 210a or i3 ESInet/PSAP 210b.

Location server 206, Gateway 208 or some other entity in serving core network 204 may query a National Emergency Address Database (NEAD) 212 for a civic location for UE 100. For example, UE 100 may provide location server 206 with the identities (e.g. MAC addresses) of one or more WLAN APs and/or Bluetooth beacons visible to UE 100 and location server 206 or some other entity in serving core network 204 may provide these identities to NEAD 212. NEAD 212 may then search a database of known WLAN APs and/or Bluetooth beacons for which corresponding civic location information (e.g. a street address and/or building designation, floor level and possibly room or apartment number) was previously configured and may return a civic location for each of one or more of the identified APs and/or beacons. The location server 206 may then convert the one or more civic locations returned by NEAD 212 into a dispatchable civic location—e.g. by selecting a civic location returned by NEAD 212 for a WLAN AP or Bluetooth beacon that appears to be closest to the location of UE 100 as inferred from measurements (e.g. for RSSI or RTT) by UE 100 of signals from the identified WLAN APs and/or Bluetooth beacons. This dispatchable civic location information may, for example, then be transferred to gateway 208 as part of HALI for UE 100.

The NEAD 212 may receive operations, administration, maintenance and provisioning functions from a National Emergency Address Manager (NEAM) 214. The NEAM 214 may receive civic location information from one or more external data sources 216. An external data source 216 may correspond to an operator, user or organization that owns or operates one or more reference points (e.g. WLAN APs and/or Bluetooth beacons) that may form one or more access networks. The civic location information that is provided may correspond to civic location information for the reference points that are owned or operated. In an example, the external data sources 216 may have unique identities that can be authenticated by the NEAM 214 and may establish some minimum level of trust in order to receive authorization to provide civic location information. The NEAM 214 may be configured to support identification and authentication of external data sources, validation of received civic location information, and provisioning of civic location information in the NEAD 212.

In operation, the UE 100 initiates an emergency call request after detecting an emergency call request from the user of UE 100 (e.g. when the user dials "911"). The serving core network 204 is configured to support the establishment of the emergency call from the UE 100 to a legacy or National Emergency Number Association (NENA) i3-capable emergency services network and its PSAPs (e.g., 210*a*, 210*b*). Functions supported by the serving core network 204 may include emergency call detection, call routing and provision of a dispatchable location. In an example, for a UE 100 with a valid subscription, the serving core network 204 may also support callback from a PSAP. The legacy ESN/PSAP 210*a* is configured to receive emergency calls and associated dispatchable location information from the serving core network 204 (e.g. from the Gateway 208), such as defined in Telecommunications Industry Association (TIA) and Alliance for Telecommunications Industry Solutions (ATIS) joint standard J-STD-036. The i3 ESInet/PSAP 210*b* is configured to receive emergency calls and dispatchable location information from the serving core network 204 (e.g. from the Gateway 208) using next generation means (e.g., such as defined in NENA i3).

Figure 3A:
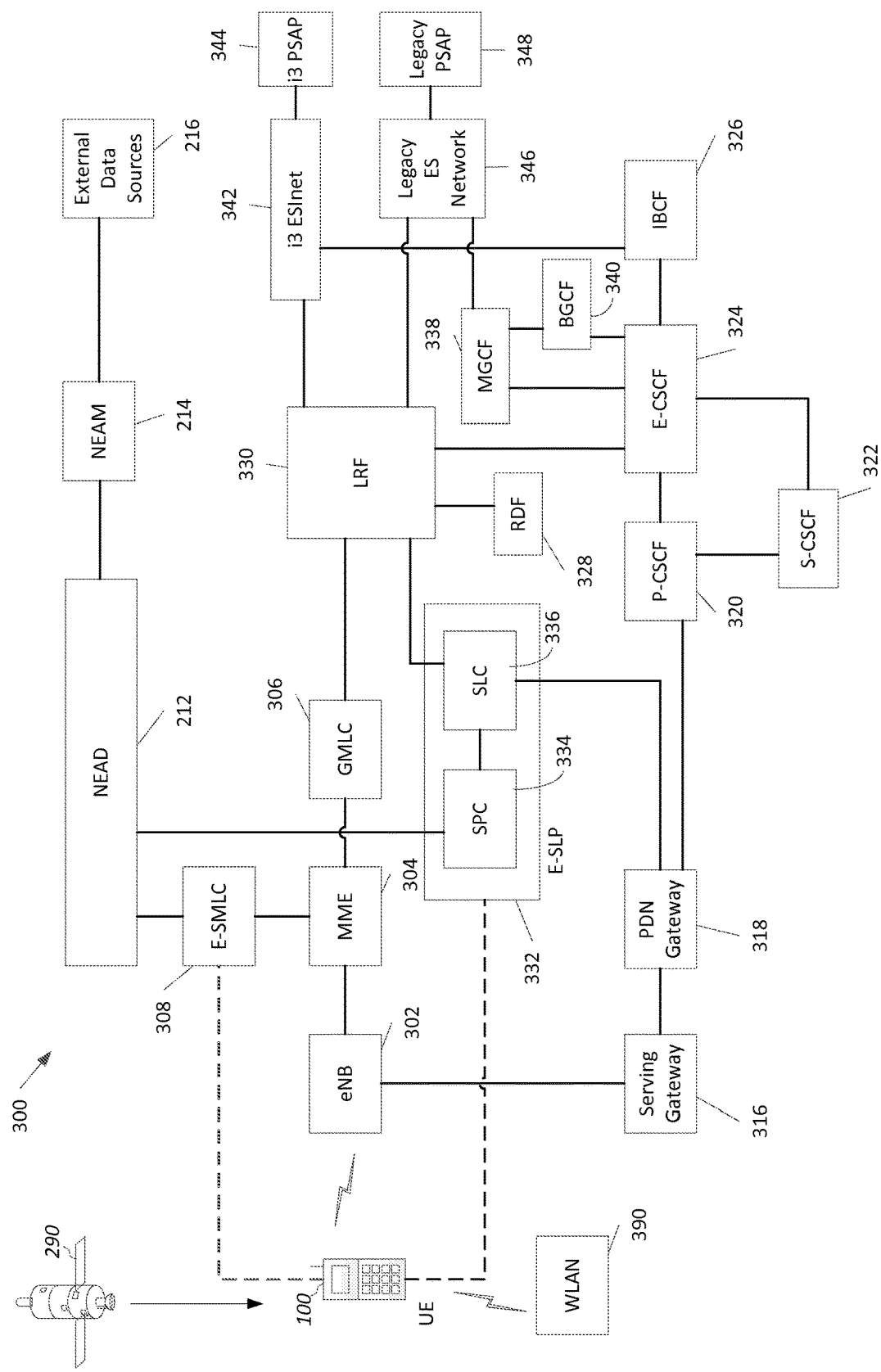
FIG. 3A is an architecture for transferring UBP information with 3GPP long term evolution (LTE) access.

Referring to FIG. 3A, with further reference to FIGS. 1 and 2, a long term evolution (LTE) architecture 300 for transferring UBP information with 3GPP LTE access is shown. A UE 100 may communicate with a serving evolved Node B (eNB) 302 in a radio access network (RAN) to obtain communication services. The RAN may correspond to access network 202 in FIG. 2, may include other network entities not shown in FIG. 3A for simplicity and may be referred to as an Evolved Universal Terrestrial Radio Access Network (E-UTRAN). The eNB 302 may be referred to as a Node B, a base station, an access point, etc. The UE 100 may measure signals from nearby eNBs (e.g. eNB 302) and obtain the identities of eNBs, timing measurements (e.g., for time of arrival (TOA), observed time difference of arrival (OTDOA)), signal strength measurements, and/or signal quality measurements for the eNBs (e.g. for Enhanced Cell ID (ECID)). The UE 100 may also or instead measure pseudo-ranges for SPS satellites 290. The eNB identities, eNB timing measurements, eNB signal strength measurements, eNB signal quality measurements and/or SPS pseudo-range measurements may be used to derive a location estimate for UE 100 (e.g. by UE 100 or by a location server such as E-SMLC 308 or E-SLP 332). The UE 100 may also or instead receive and optionally measure signals from nearby APs in a WLAN 390 which may include obtaining identities (e.g. MAC addresses) for WiFi or Bluetooth (BT) APs (which may also be referred to as beacons) in WLAN 390 whose signals can be received by UE 100 and possibly measuring characteristics of these received signals such as Received Signal Strength Indication (RSSI) or Round Trip signal propagation Time (RTT). The WLAN AP identities and measurements may be used to obtain a location for UE 100—e.g. by UE 100 or by a location server such as E-SMLC 308 or E-SLP 332. The eNB and/or WLAN AP identities may be used to query the NEAD 212 (e.g. by a location server such as E-SMLC 308 or E-SLP 332) for a civic location for UE 100 as previously described. Although only one WLAN 390 is shown in FIG. 3A, there may be other WLANs (not shown in FIG. 3A) containing WiFi and/or BT APs that are visible to UE 100; reference herein to WLAN 390 is therefore to be considered as referring possibly to more than one WLAN.

The eNB 302 may communicate with a serving MME 304 for UE 100, which may perform various control functions such as mobility management, gateway selection, authentication, bearer management, etc. MME 304 may communicate with an Enhanced Serving Mobile Location Center (E-SMLC) 308 and a Gateway Mobile Location Center (GMLC) 306. The E-SMLC 308 may support UE-based, UE-assisted, network-based and/or network-assisted positioning methods for UE 100 and may support one or more MMEs (e.g. MME 304). The E-SMLC 308 may also be referred to as a location server (LS), a Stand Alone SMLC (SAS), etc. E-SMLC 308 may communicate with the NEAD 212 to support location services. E-SMLC 308 may correspond to location server 206 in FIG. 2. The GMLC 306 may perform various functions to support location services, interface with external clients (e.g., the NEAD 212), and provide services such as subscriber privacy, authorization, authentication, billing, etc. A Location Retrieval Function (LRF) 330 may communicate with GMLC 306 and may route or help route IP-based emergency calls to a Public Safety Answering Points (PSAPs) such as the i3 ESInet 342 and i3 PSAP 344, and well as legacy systems such as the legacy ES network 346 and the legacy PSAP 348. An Emergency SUPL Location Platform (E-SLP) 332, including SUPL Positioning Center (SPC) 334 and a SUPL Location Center (SLC) 336, are also configured to communicate location information with the LRF 330. The E-SLP 332 is an example of a location server 206 and the LRF 330 is an example of a Gateway 208 in the serving core network 204. In some networks, E-SLP 332 may be deployed but not E-SMLC 308 or vice versa.

A Serving Gateway 316 may perform various functions related to IP data transfer for UEs such as data routing and forwarding, mobility anchoring, etc. A Packet Data Network (PDN) Gateway 318 may perform various functions such as maintenance of data connectivity for UEs, IP address allocation, etc. An IP Multimedia Subsystem (IMS) network may include various network entities to support IMS services such as Voice-over-IP (VoIP) calls. The IMS network may include the LRF 330, a Proxy Call Session Control Function (P-CSCF) 320, a Serving Call Session Control Function (S-CSCF) 322, an Emergency Call Session Control Function (E-CSCF) 324, a Breakout Gateway Control Function 340, a media gateway control function (MGCF) 338, an Interconnection Border Control Function (IBCF) 326, and a Routing Determination Function (RDF) 328.

In operation, the LTE architecture 300 may utilize LTE interfaces and protocols for control plane location. The LPP protocol defined in 3GPP TS 36.355 combined with the OMA LPPe protocol may be used over the Uu interface between the UE 100 and the eNB 302 for positioning of the UE 100 by the E-SMLC 308. LPP/LPPe messages may be transferred between the UE 100 and the E-SMLC 308 via the MME 304 and the eNB 302 for the UE 100 as described in 3GPP TSs 23.271 and 36.305. To support heightened accuracy location information (HALI), the E-SMLC 308 may be configured to request (e.g. by sending an LPP/LPPe Request Location Information message to UE 100), and the UE 100 may be configured to provide (e.g. by sending an LPP/LPPe Provide Location Information message to E-SMLC 308) the identities of visible WLAN APs, signal measurements of visible WLAN APs (e.g. RSSI, RTT), and an uncompensated barometric pressure (UBP) if supported by the UE 100. This information is supported in the OMA LPPe version 1.0, version 1.1 and version 2.0 protocols.

In an alternative embodiment, either (i) the LPP protocol alone without LPPe or (ii) the Radio Resource Control (RRC) protocol for LTE defined in 3GPP 36.331 may be used over the Uu interface between the UE 100 and the serving eNB 302 for positioning of the UE 100 by the E-SMLC 308. In the case of LPP (alternative (i)), LPP messages may be transferred between the UE 100 and the E-SMLC 308 via the MME 304 and the serving eNB 302 for the UE 100 as described in 3GPP TSs 23.271 and 36.305. In the case of RRC (alternative (ii)), RRC messages may be transferred between the UE 100 and the serving eNB 302 and LTE Positioning Protocol A (LPPa) messages may be transferred between eNB 302 and E-SMLC 308 via the MME 304 for the UE 100 as described in 3GPP TSs 23.271 and 36.305. To support heightened accuracy location information (HALI), the E-SMLC 308 may be configured to request (e.g. by sending an LPP Request Location Information message to UE 100 or an LPPa request message to eNB 302 which may cause eNB 302 to send an RRC request message to UE 100), and the UE 100 may be configured to provide (e.g. by sending an LPP Provide Location Information message to E-SMLC 308 or an RRC response to eNB 302 which causes eNB 302 to send an LPPa response to E-SMLC 308) the identities of visible WLAN APs, signal measurements of visible WLAN APs (e.g. RSSI, RTT), and an uncompensated barometric pressure (UBP) if supported by the UE 100.

A Location Services (LCS) Application Protocol (LCS-AP) defined in 3GPP TS 29.171 may be used over the SLs interface between the MME 304 and the E-SMLC 308 to enable the MME 304 to request location information for the UE 100 from the E-SMLC 308 using the 3GPP control plane solution. To support HALI exchanges, the LCS-AP protocol may enable the E-SMLC 308 to return the HALI to the MME 304. An Evolved Packet Core (EPC) LCS Protocol (ELP) defined in 3GPP TS 29.172 may be used over the SLg interface between the MME 304 and the GMLC 306 to enable the GMLC 306 to request and obtain location information for the UE 100 using the 3GPP control plane solution. To support HALI the ELP protocol may enable the MME 304 to return HALI to the GMLC 306. A L0 interface may be used between the LRF 330 and the GMLC 306 to enable the LRF 330 to request location information for the UE 100 from the GMLC 306 using a control plane solution in the case that the UE 100 is establishing or has established an IMS emergency call to a PSAP (e.g. i3 PSAP 344 or legacy PSAP 348). To support HALI, the L0 interface may enable the GMLC 306 to return HALI to the LRF 330. Possible protocols defined for the L0 interface may include the Mobile Location Protocol (MLP) defined by OMA, the Hypertext Transfer Protocol (HTTP) Enabled Location Delivery (HELD) protocol defined by the Internet Engineering Task Force (IETF), and the E2 interface protocol defined in TIA/ANSI joint standard J-STD-036. An Le E2 interface may be used between the LRF 330 and an entity (e.g. an Automatic Location Identification (ALI) entity) in a legacy emergency services (ES) network 346 to enable the legacy ES network 346 to request location information for the UE 100 from the LRF 330 in the case that the UE 100 establishes an emergency call to a legacy PSAP 348. The Le E2 interface may use either the E2 protocol defined in TIA/ANSI joint standard J-STD-036 and in the NENA-05-001 standard from NENA or the Mobile Location Protocol (MLP) defined by OMA. An Le i3 interface may be used between the LRF 330 and the emergency services i3 network (ESInet) 342 to enable an entity in or connected to the ESInet 342 (e.g. an Emergency Services Routing Proxy (ESRP) or the i3 PSAP 344) to request location information for the UE 100 from the LRF 330 in the case that the UE establishes or has established an emergency call to the i3 ESInet 342. In an example, the Le i3 interface may use HELD, MLP, or the IETF Session Initiation Protocol (SIP) SUBSCRIBE/NOTIFY protocol.

The LTE architecture 300 may also or instead utilize interfaces and protocols for SUPL User Plane Location. A Lup interface as defined in OMA TS OMA-AD-SUPL-V2_0 may be used between the UE 100 (referred to as a SUPL Enabled Terminal (SET)) and the E-SLP 332 to support positioning of the UE 100 using the OMA SUPL user plane solution. In the case of location in association with an emergency call, the E-SLP 332 may be configured to be used in the serving core network for the UE 100. The Lup interface enables exchange of ULP messages, defined in OMA-TS-ULP-V2_0_3, between the UE 100 and the E-SLP 332. The E-SLP 332 may be split logically or physically into the SLC 336 and the SPC 334. The SLC 336 is configured to establish and control a SUPL session with the UE 100. The SPC 334 is configured to obtain a location of the UE 100. The endpoint for any ULP message is then either the SLC 336 or the SPC 334 depending on whether the ULP message is used for control and service provision or for positioning, respectively. In the case of the UE 100 (e.g., with LTE access), the ULP messages used for positioning typically encapsulate one or more LPP messages. Each encapsulated LPP message can further encapsulate one LPPe message. To support heightened accuracy location, LPP/LPPe may be used to enable the SPC 334 to request, and the UE 100 to return the same information as described for control plane location above using LPP, LPP/LPPe or RRC/LPPa.

An Internal Location Protocol (ILP) defined in OMA TS OMA-TS-ILP-V2_0_3 V2_0_3 may be used over the Llp interface between an SLC 336 and SPC 334 to enable the SLC 336 to instigate positioning of the UE 100 using the SPC 334 and to obtain location information for the UE 100 from the SPC 334. To support heightened accuracy location, the ILP protocol may enable an SPC 334 to return HALI to the SLC 336. An L0 interface may be used between the LRF 330 and the E-SLP 332 to enable the LRF 330 to request location information for the UE 100 from the E-SLP 332 using the SUPL solution in the case that the UE 100 establishes or has established an IMS emergency call to a PSAP (e.g. legacy PSAP 348 or i3 PSAP 344). To support heightened accuracy location, the L0 interface enables the E-SLP 332 to return heightened accuracy location information to the LRF 330. Possible protocols defined for the L0 interface may include MLP, HELD and the E2 interface protocol defined in TIA/ATIS joint standard J-STD-036. The Le E2 and Le i3 interfaces in the user plane may be the same as those described for control plane location above.

Figure 3B:
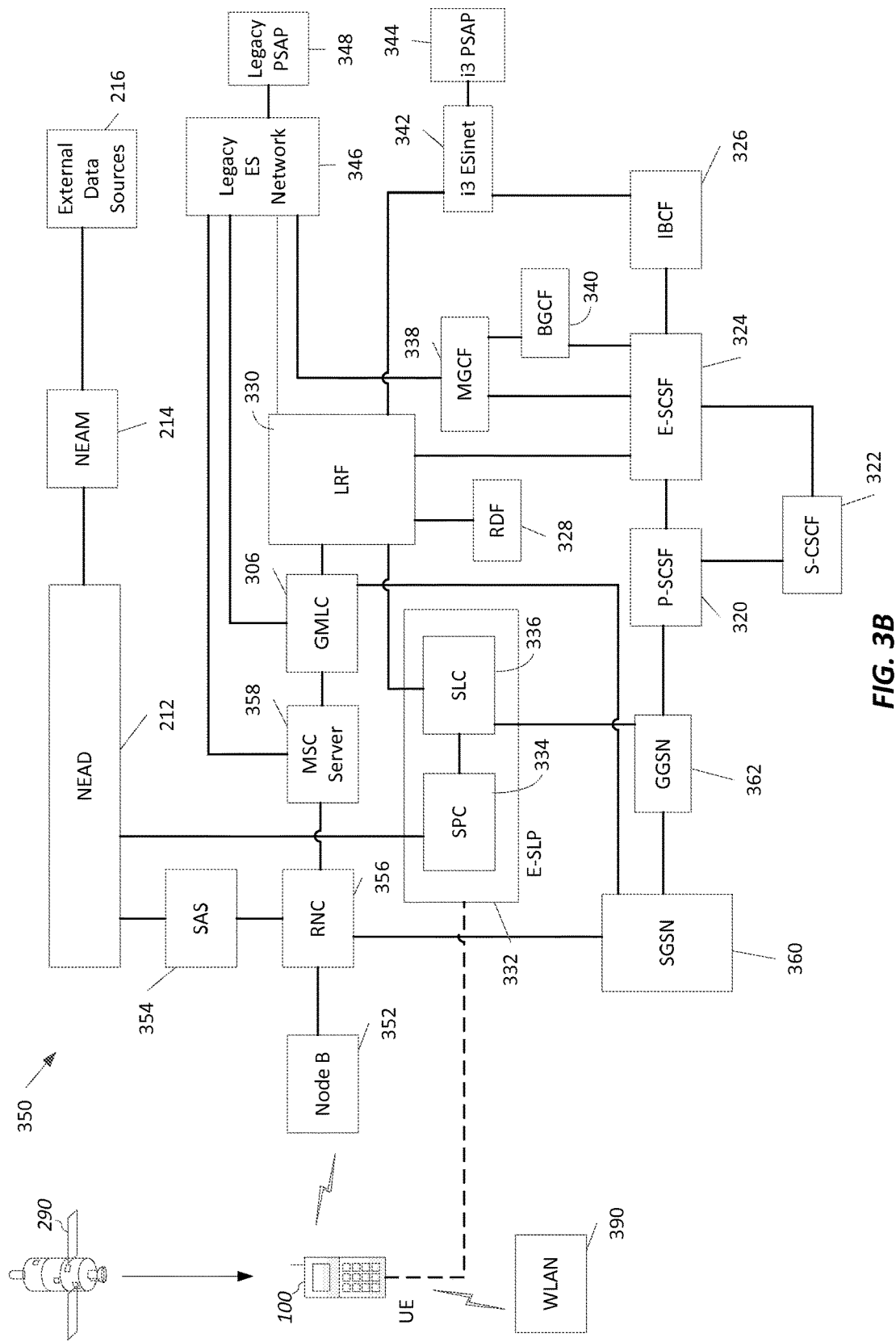
FIG. 3B is an architecture for transferring UBP information with Universal Mobile Telecommunications System (UMTS) access.

Referring to FIG. 3B, with further reference to FIGS. 1-3A, a UMTS architecture 350 for transferring UBP information with Universal Mobile Telecommunications System (UMTS) access is shown. The UMTS architecture 350 includes a carrier network with a Node B 352, an radio network controller (RNC) 356, a stand-alone SMLC (SAS) 354, a mobile switching center (MSC) server 358, a GMLC 306, a serving GPRS support node (SGSN) 360, a gateway GPRS support node (GGSN) 362, in addition to the elements as depicted in FIG. 3A and previously described that are also present in FIG. 3B. In a UMTS architecture, the SAS 354 is an example of a location server 206 in a serving core network 204.

An RRC protocol for UMTS defined in 3GPP TS 25.331 may be used over the Uu interface for positioning of the UE 100 by the RNC 356 in the case of control plane location with Circuit Switched (CS) access. To support heightened accuracy location, the RNC 356 is configured to request, and the UE 100 is configured to provide the identities of visible WLAN APs (e.g. APs in WLAN 390), and an uncompensated barometric pressure (UBP), if supported by the UE 100. A Positioning Calculation Application Part (PCAP) protocol as defined in 3GPP TS 25.453 may be used over the Iupc interface between the RNC 356 for the UE 100 and the SAS 354 to enable the RNC 356 to request location information for the UE 100 from the SAS 354 using the 3GPP control plane solution. The RNC 356 and the SAS 354 can interact using PCAP in either a SAS centric mode where the SAS 354 controls the use of different position methods and RNC 356 interaction with the UE 100, or in RNC centric mode where the RNC 356 controls the use of different position methods and all interaction with the UE 100 and invokes the SAS 354 only to provide assistance data for the UE 100 or to compute a location from location related measurements provided by the UE 100 to the RNC 356. To support heightened accuracy location, the PCAP protocol may enable the RNC 356 to transfer the additional location information provided using RRC by the UE 100 (e.g. measurements of WLAN 390 and/or UBP). A Radio Access Network Application Part (RANAP) protocol defined in 3GPP TS 25.413 may be used over the Iu-cs interface between the MSC server 358 for the UE 100 and the RNC 356 to enable the MSC server 358 to request location information for the UE 100 from the RNC 356 using the 3GPP control plane solution. A Mobile Application Part (MAP) protocol as defined in 3GPP TS 29.002 may be used over the Lg interface between MSC server 358 for the UE 100 and the GMLC 306 to enable the GMLC 306 to request and obtain location information for the UE 100 using the 3GPP control plane solution. A Le E2 interface may be used between the GMLC 306 and an entity (e.g. an ALI) in legacy ES network 346 to enable the legacy ES network 346 to request location information for the UE 100 from the GMLC 306 in the case that the UE 100 has established an emergency call to legacy PSAP 348 using the CS domain. The Le E2 interface is defined in TIA/ATIS joint standard J-STD-036 and in the NENA-05-001 standard (from NENA).

The UMTS architecture 350 also supports interfaces and protocols within and to a serving UMTS network to support heightened accuracy location in the case of Packet Switched (PS) access and control plane location. The RRC protocol as defined in 3GPP TS 25.331 may be used over the Uu interface for positioning of the UE 100 by the RNC 356 in the case of control plane location with PS access. The PCAP protocol as defined in 3GPP TS 25.453 may be used over the Iupc interface between the RNC 356 for the UE 100 and the SAS 354 to enable the RNC 356 to request location information for the UE 100 from the SAS 354 using the 3GPP control plane solution. The RANAP protocol defined in 3GPP TS 25.413 may be used over the Iu-ps interface between the SGSN 360 for the UE 100 and the RNC 356 to enable the SGSN 360 to request location information for the UE 100 from the RNC 356 using the 3GPP control plane solution. The MAP protocol defined in 3GPP TS 29.002 may be used over the Lg interface between the SGSN 360 for the UE 100 and the GMLC 306 to enable the GMLC 306 to request and obtain location information for the UE 100 using the 3GPP control plane solution. The ELP protocol defined in 3GPP TS 29.172 may be used over the Lgd interface between the SGSN 360 for the UE 100 and the GMLC 306 to enable the GMLC 306 to request and obtain location information for the UE 100 using the 3GPP control plane solution. The Lgd interface is applicable to an SGSN that supports 3GPP Evolved Packet System (EPS) based interfaces and protocols. The L0 interface may be used between the LRF 330 and the GMLC 306 to enable the LRF 330 to request location information for the UE 100 from the GMLC 306 using the 3GPP control plane solution in the case that the UE 100 is establishing or has established an emergency call to a PSAP (e.g. legacy PSAP 348 or i3 PSAP 344) using PS access. To support heightened accuracy location, the L0 interface may enable the GMLC 306 to return heightened accuracy location information to the LRF 330. Possible protocols defined for the L0 interface include MLP, HELD and the E2 interface protocol defined in J-STD-036. The Le E2 interface may be used between the LRF 330 and the legacy ES network 346 in a legacy emergency services network to enable the legacy ES network 346 to request location information for the UE 100 from the LRF 330 in the case that the UE 100 has established an emergency call to legacy PSAP 348 using PS access. The Le E2 interface may use the E2 protocol defined in TIA/ATIS joint standard J-STD-036 and in NENA-05-001 or the OMA MLP protocol. The Le i3 interface may be used between the LRF 330 and an emergency services i3 network (ESInet) 342 to enable an entity in or connected to the ESInet (e.g. an ESRP or i3 PSAP 344) to request location information for the UE 100 from LRF 330 in the case that the UE 100 is establishing or has established an emergency call to the ESInet 342 using PS access. The Le i3 interface may use HELD, MLP or SIP SUBSCRIBE/NOTIFY.

The UMTS architecture 350 also or instead supports interfaces and protocols within UMTS PS Access to support heightened accuracy location in the case of user plane location. The Lup interface as defined in OMA specification OMA-AD-SUPL-V2_0 may be used between the UE 100 and the E-SLP 332 to support positioning of the UE 100 using the OMA SUPL user plane solution. The Lup interface enables exchange of SUPL ULP messages, defined in OMA TS OMA-TS-ULP-V2_0_3, between the UE 100 being positioned and the E-SLP 332. The E-SLP 332 is split into the SLC 336 and the SPC 334 with the SLC 336 being used to establish and control a SUPL session between the UE 100 and the E-SLP 332 and the SPC 334 being used to obtain a location of the UE 100. The endpoint for any SUPL ULP message is either the SLC 336 or the SPC 334 depending on whether the ULP message is used for control and service provision (when the end point is the SLC 336) or for positioning (when the endpoint is the SPC 334). In the case of a UE 100 with UMTS access, ULP messages used for positioning may encapsulate one or more LPP messages or one or more RRC messages for the RRC protocol defined in 3GPP TS 25.331. In the case of LPP messages, each encapsulated LPP message can further encapsulate one LPPe message. To support heightened accuracy location, LPP, LPP/LPPe or RRC may be used to enable the SPC 334 to request and the UE 100 to return the same information as described for control plane location (e.g. measurements for WLAN 390 and/or UBP). The ILP protocol as defined in OMA TS OMA-TS-ILP-V2_0_3 may be used over the Llp interface between the SLC 336 and SPC 334 to enable the SLC 336 to instigate positioning of the UE 100 using the SPC 334 and to obtain location information for the UE 100 from the SPC 334. The L0 interface may be used between the LRF 330 and the E-SLP 332 to enable the LRF 330 to request location information for the UE 100 from the E-SLP 332 in the case that the UE 100 is establishing or has established an IMS emergency call to a PSAP (e.g. legacy PSAP 348 or i3 PSAP 344). Possible protocols defined for the L0 interface include MLP, HELD and the E2 interface protocol defined in J-STD-036. The impacts for the Le E2 and the Le i3 interface are the same as those for UMTS control plane location previously described.

Figure 4:
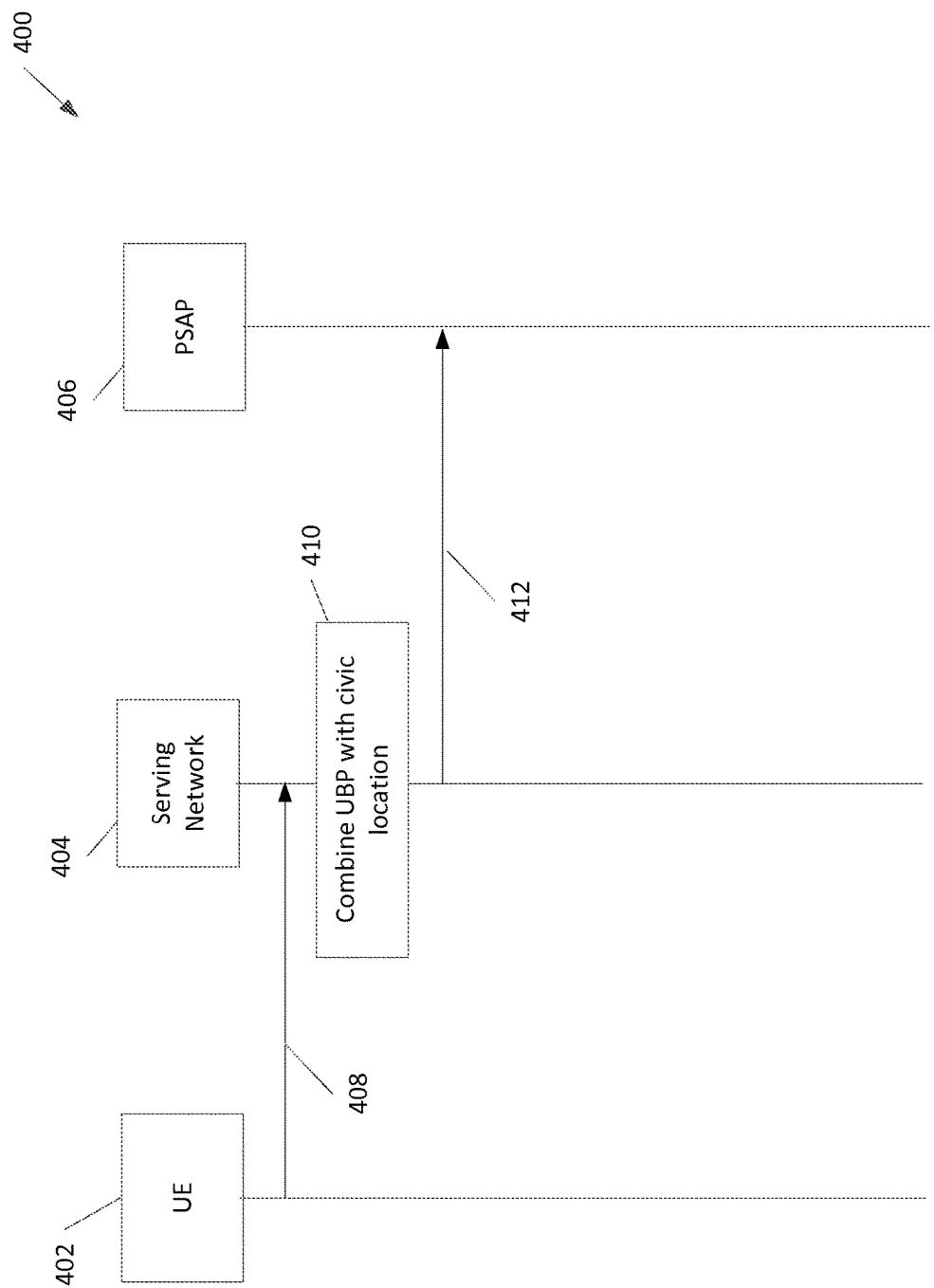
FIG. 4 is a message flow diagram of an example UBP transfer procedure with civic location information.

Referring to FIG. 4, with further reference to FIGS. 1-3B, a message flow diagram 400 of an example UBP transfer procedure with civic location information is shown. The nodes in the message flow include a UE 402, a serving network 404, and a PSAP 406. The UE 402 may correspond to the UE 100 in FIGS. 1-3B. The serving network 404 may include one or more elements of the serving core network 204 in FIG. 2 and/or the LTE and UMTS architectures 300, 350 as depicted in FIGS. 3A and 3B. The PSAP 406 may correspond to the legacy PSAP 348 or the i3 PSAP 344. For example, uncompensated barometric pressure (UBP) may be transferred from the UE 402 to the PSAP 406 (e.g., i3 PSAP 344, legacy PSAP 348) via a location server in the serving network 404 (e.g. location server 206, E-SMLC 308, E-SLP 332 or SAS 354) and a gateway in the serving network 404 (e.g. Gateway 208, GMLC 306 or LRF 330). The pressure sensor 130 in the UE 402 may be configured to measure UBP, and the processor 111 and the wireless transceiver 121 may be configured to provide the UBP to serving core network 404 via a first message 408. In an example, the first message 408 can be provided by the UE 402 to a location server (e.g. an E-SMLC 308, E-SLP 332 or SAS 354) using LPPe where LPPe may be used in combination with LPP (i.e. as LPP/LPPe). The UBP supported in LPPe may be in units of Pascal (Pa) with a range of 30,000 to 115,000 Pa in one embodiment. Other measurement units (e.g., millibars) and ranges may also be used for UBP. In general, the UBP range should be sufficient to represent possible indoor or outdoor atmospheric pressures at any likely altitude for the UE 402. In another example, the first message 408 can be provided by the UE 402 to a location server (e.g. an E-SMLC 308, E-SLP 332 or SAS 354) using (i) LPP, (ii) RRC for LTE (e.g. between UE 402 and a serving eNB like eNB 302) plus LPPa (e.g. between a serving eNB and E-SMLC 308) or (iii) RRC for UMTS (e.g. between UE 402 and a serving RNC like RNC 356) plus PCAP (e.g. between a serving RNC and SAS 354).

At stage 410, the serving network 404 (e.g. a location server 206 in serving network 404 such as E-SMLC 308, E-SLP 332, SPC 334 or SAS 354) is configured to combine the UBP received via the first message 408 with civic location information for UE 402. The civic location information may be provided by a NEAD such as NEAD 212 as described previously. Existing internet standards (e.g., IETF RFC 6848) provide a mechanism to define and register with Internet Assigned Numbers Authority (IANA) extension types for civic location as used with Presence Information Data Format Location Object (PIDF-LO) documents, or by Dynamic Host Configuration Protocol (DHCP). A civic address type based on this mechanism may be registered to convey UBP as a number (e.g. a decimal or binary number in units of Pascal or millibars). If a dispatchable civic location for a UE 402 is determined at a location server (e.g. location server 206, E-SMLC 308, SAS 354, SPC 334 or E-SLP 332) using one or more civic locations for the UE 402 received from the NEAD 212 (e.g. as described previously in association with FIG. 2) and if UBP is also received at the location server from the UE 402, at stage 410 the location server in the serving network 404 can combine the UBP into the civic location using the civic address type that was registered with IANA to convey UBP. A message containing the combined dispatchable civic location and UBP parameter 412 can be transferred and processed transparently through intermediate entities (e.g. one or more of MME 304, GMLC 306, SLC 336, RNC 356, MSC Server 358, SGSN 360), and as far as a gateway to the PSAP (e.g. either a GMLC 306 or LRF 330). In an example, the combined dispatchable civic location and UBP parameter 412 is transferred using the IETF HELD protocol, OMA MLP or the J-STD-036 E2 protocol to the PSAP 406 with the PSAP 406 presenting both the dispatchable civic location and UBP measurement to the PSAP 406 operator (not shown in FIG. 4). In an another example, the gateway (e.g. GMLC 306 or LRF 330) in the serving network 404 may extract the UBP from the received dispatchable civic location and UBP parameter 412 and transfer the UBP separately to the PSAP 406 (e.g. using a new parameter for HELD, MLP or the E2 protocol). In the case that a dispatchable civic location is not obtained by a location server in the serving network 404 from the NEAD 212, the location server in the serving network 404 may be configured to construct an empty dispatchable civic location parameter 412 which contains only the UBP. This empty dispatchable civic location (e.g., just the UBP) may be conveyed in the same manner as for the combined dispatchable civic location and UBP parameter 412 as previously described.

The flow diagram 400 may be modified based on evolving data formats, interfaces and protocols. For example, a new civic address (CA) type may be registered with IANA specifically to carry UBP as described above. Alternatively, a new civic address type may be registered with IANA to carry environmental data for the location of a UE such as temperature, humidity as well as UBP. Alternatively again, a new miscellaneous civic address type may be registered with IANA to carry miscellaneous information that does not fit elsewhere within a civic location and whose content is not constrained or defined by IANA. This new miscellaneous civic address type could comprise a character string and may be used to convey a particular character string such as "UncompensatedBaroPressure=nnnnnnPa" to convey UBP (e.g. where nnnnnn is a sequence of decimal digits representing the value of UBP expressed in decimal). An existing civic address type already registered with IANA may also be used to convey UBP. For example, there are two existing civic address types for a PIDF-LO that may be used to convey UBP. Specifically, civic address type 22 (referred to as LOC) contains additional (i.e., unspecified) location information, and civic address type 32 (referred to as ADD-CODE) allows an additional numeric code. The type 22 and type 32 civic address types may be extended to include a character string such as "UncompensatedBaroPressure=nnnnnnPa" to convey UBP (e.g. where nnnnnn is a sequence of decimal digits representing a UBP value in decimal).

Figure 5:
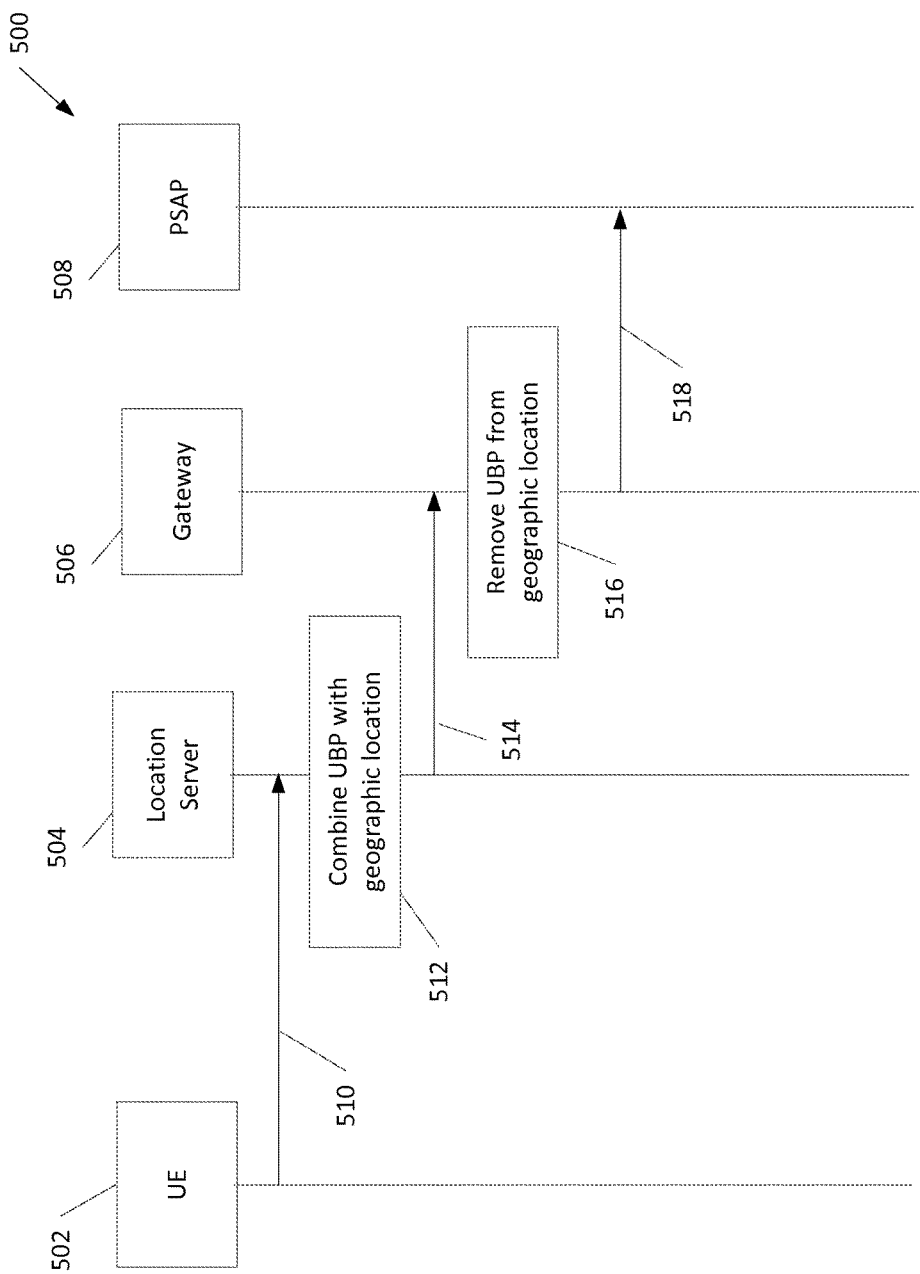
FIG. 5 is message call flow diagram of another example UBP transfer procedure with geographic location information.

Referring to FIG. 5, with further reference to FIGS. 1-3B, message call flow diagram 500 shows another example of a UBP transfer procedure with geographic location information. The nodes in the message call flow include a UE 502, a location server 504, a Gateway 506, and a PSAP 508. The UE 502 may correspond to UE 100 in FIGS. 1-3B. The location server 504 and gateway 506 may correspond to one or more elements of the communication system 200 and/or the LTE and UMTS architectures 300, 350, as depicted in FIGS. 2, 3A and 3B. For example, location server 504 may correspond to location server 206, E-SMLC 308, E-SLP 332, SPC 334 or SAS 354. Gateway 506 may correspond to Gateway 208, LRF 330 or GMLC 306. The PSAP 508 may correspond to the legacy PSAP 348 or the i3 PSAP 344. For example, uncompensated barometric pressure (UBP) may be transferred from the UE 502 to the PSAP 508 (e.g., i3 PSAP 344, legacy PSAP 348) via the location server 504 (e.g. location server 206, E-SMLC 308, SAS 354 or E-SLP 332)

and the Gateway 506 (e.g. Gateway 208, GMLC 306 or LRF 330). The pressure sensor 130 in the UE 502 may be configured to measure UBP, and the processor 111 and the wireless transceiver 121 may be configured to provide the UBP to the location server 504 via a first message 510. In an example, the first message 510 is provided by the UE 502 to the location server 504 (e.g. an E-SMLC 308, SAS 354 or E-SLP 332) using LPPe where LPPe may be used in combination with LPP (e.g. as LPP/LPPe). In another example, the first message 510 may be provided by the UE 502 to a location server 504 (e.g. an E-SMLC 308, E-SLP 332 or SAS 354) using (i) LPP, (ii) RRC for LTE (e.g. between UE 502 and a serving eNB like eNB 302) plus LPPa (e.g. between a serving eNB and E-SMLC 308) or (iii) RRC for UMTS (e.g. between UE 502 and a serving RNC like RNC 356) plus PCAP (e.g. between a serving RNC and SAS 354). A geographic location of the UE 502 may be determined by the location server 504 or may be received at the location server 504 from the UE 502. At stage 512, the location server 504 is configured to combine the geographic location with UBP (e.g., as received from the UE 502 in the first message 510). A combined geographic location and UBP parameter 514 may then be transferred to the Gateway 506 (e.g., the GMLC 306 or LRF 330). The transfer of the combined geographic location and UBP parameter may be transparent to intermediate entities in a serving network (e.g. may be transparent to one or more of MME 304, GMLC 306, SLC 336, RNC 356, MSC Server 358, SGSN 360). The combined geographic location and UBP parameter 514 may further be transferred transparently from location server 504 to Gateway 506 using the existing interfaces and protocols for a 3GPP control plane location solution or SUPL user plane location solution that were described previously in association with FIGS. 3A and 3B. These interfaces may include one or more of the 3GPP SLs, SLg, L0, Lg, Lgd, Iupc, Iu-cs and Iu-ps interfaces). In an example, if a geographic location is not received from the UE 502 by the location server 504, or not determined by the location server 504, any empty (Null) geographic location may be created by the location server 504 to transfer the UBP as far as the Gateway 506 (e.g. GMLC 306 or LRF 330) to the PSAP 508. At stage 516, the Gateway 506 (e.g., GMLC 306 or LRF 330) is configured to parse the combined geographic location and UBP parameter 514 and remove the UBP from the geographic location (or from a Null geographic location if the geographic location is empty). The removed UBP may be sent as a separate parameter to the PSAP 508. For example, the Gateway 506 may send the removed UBP as a parameter in message 518 to the PSAP 508.

Typically, geographic location may be represented in 3GPP protocols by octet strings defined in 3GPP TS 23.032. To combine UBP into a 3GPP geographic location, the location server 504 may be configured to concatenate a small fixed number (e.g. two or three) of additional octets with a geographic location octet string to convey UBP. In an example, the UBP may be encoded as a binary value in units of Pa using three additional octets added to a geographic location string. The additional octets may be concatenated at the end of a geographic location string and may be detected (e.g. by a Gateway 506) by determining that the length of the combined geographic location string and UBP exceeds the length defined for the type of the geographic location (e.g. as indicated by the first octet in the geographic location string) by the known fixed number of octets used to encode the UBP. The gateway 506 may then be configured to parse the additional UBP octets from the combined geographic location and UBP parameter.

In an example, the UBP could be included by the location server 504 in the altitude coordinate of a geographic location. For 3GPP networks, there are two types of geographic location shapes that contain altitude (e.g., as standardized in TS 23.032). The two geographic location shapes include the ellipsoid point with altitude, and the ellipsoid point with altitude and uncertainty ellipsoid. For both geographic location shapes, the altitude coordinate is 2 octets which would support inclusion of UBP in units of Pa to a precision of two Pa. In an embodiment the UBP may be converted to an equivalent altitude (or depth) for some fixed reference sea level pressure (not related to any current sea level pressure) using a known algorithm by the location server 504 (e.g. E-SMLC 308, SAS 354 or E-SLP 332) at stage 512, and transformed back into UBP at stage 516 by the Gateway 506 (e.g. GMLC 306 or LRF 330). Serving networks may be configured to determine whether the altitude coordinate of a geographic location represents UBP information or real altitude. In an example, a network may only support one type of altitude coordinate for all UEs—e.g. either altitude encoding UBP or a real altitude. In another example, a convention may be employed in a network to distinguish an altitude coordinate carrying a UBP from an altitude coordinate representing real altitude. Such a convention would allow a serving network to support both real altitude and altitude encoding a UBP. As an example, and not a limitation, one possible convention to distinguish a real altitude from an altitude value encoding a UBP may include using a 7 bit uncertainty altitude in the case of an ellipsoid point with altitude an uncertainty ellipsoid (e.g. set the value of the uncertainty to zero, which normally means no error, to indicate UBP). Another example convention, applicable to both the ellipsoid point with altitude and the ellipsoid point with altitude and uncertainty ellipsoid, includes reserving a range of altitude values that will normally not occur to encode UBP. For example, depth in the range —$214$ to –$215$ meters might be reassigned to encode UBP, which could effectively mean assigning 14 bits to encode UBP and may allow for a precision of about 8 Pa. In an embodiment, a Mobile Location Protocol (MLP) data structures may be used to define a UBP parameter. For example, in MLP, geographic location shapes may be defined as character strings using XML. Existing or new XML tags may be used to define a UBP parameter.

In an embodiment, a location server (e.g. E-SMLC 308, E-SLP 332 or SAS 354) may determine a dispatchable civic location for a UE (e.g. UE 100) using one or more civic locations for the UE received from the NEAD 212 (e.g. as described previously in association with FIG. 2). The location server may then convey the determined dispatchable civic location within a PIDF-LO location object (e.g., as defined in RFCs 5139 and 6848) which may be transferred to a gateway (e.g. GMLC 306 or LRF 330) and then either transferred without change to the PSAP (e.g. to i3 PSAP 344 or legacy PSAP 348 using HELD, MLP or the E2 protocol in J-STD-036) or used to extract the dispatchable civic location part which could be transferred to the PSAP (e.g. using HELD, MLP or the free format civic location supported by the J-STD-036 E2 protocol). A PIDF-LO location object may include a civic location, a geographic location or a civic location plus geographic location as well as a number of other location related parameters such as a date/timestamp and privacy requirements. The geographic location component of a PIDF-LO may not need to be used as geographic location transfer from a location server to a gateway in a serving network may be supported by other existing parameters in applicable 3GPP and OMA protocols for the 3GPP control plane location solution and OMA SUPL user plane location solution. A location server (e.g. E-SMLC 308, E-SLP 332 or SAS 354) may combine a UBP (e.g. received from a UE 100 or UE 502) into a PIDF-LO using a new or existing parameter, new or existing field or other new or existing value in a PIDF-LO to support inclusion of a UBP. The PIDF-LO containing the UBP may then be transferred to a PSAP via a gateway (e.g. Gateway 208, LRF 330 or GMLC 306) or may be transferred as far as a gateway where the UBP is extracted from the PIDF-LO and transferred separately to a PSAP.

Figure 6:
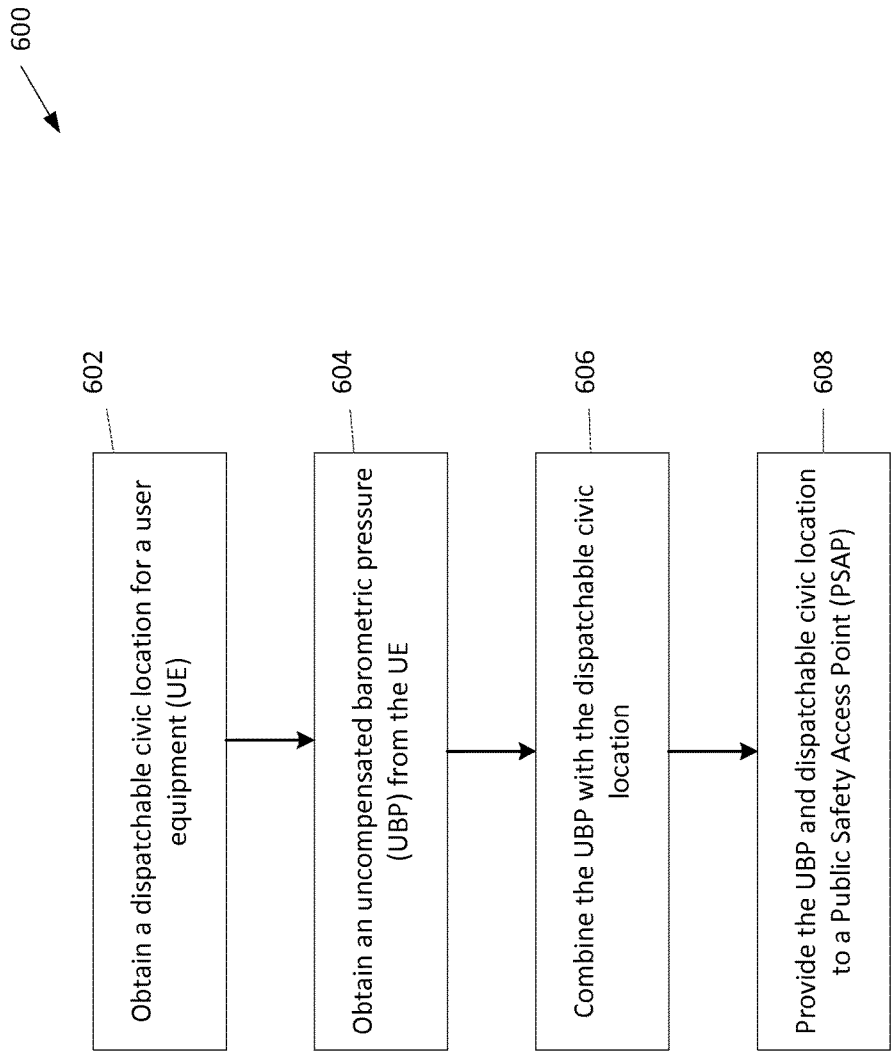
FIG. 6 is a block flow diagram of a process of providing UBP and civic location information to a Public Safety Answering Point (PSAP).
Figure 9:
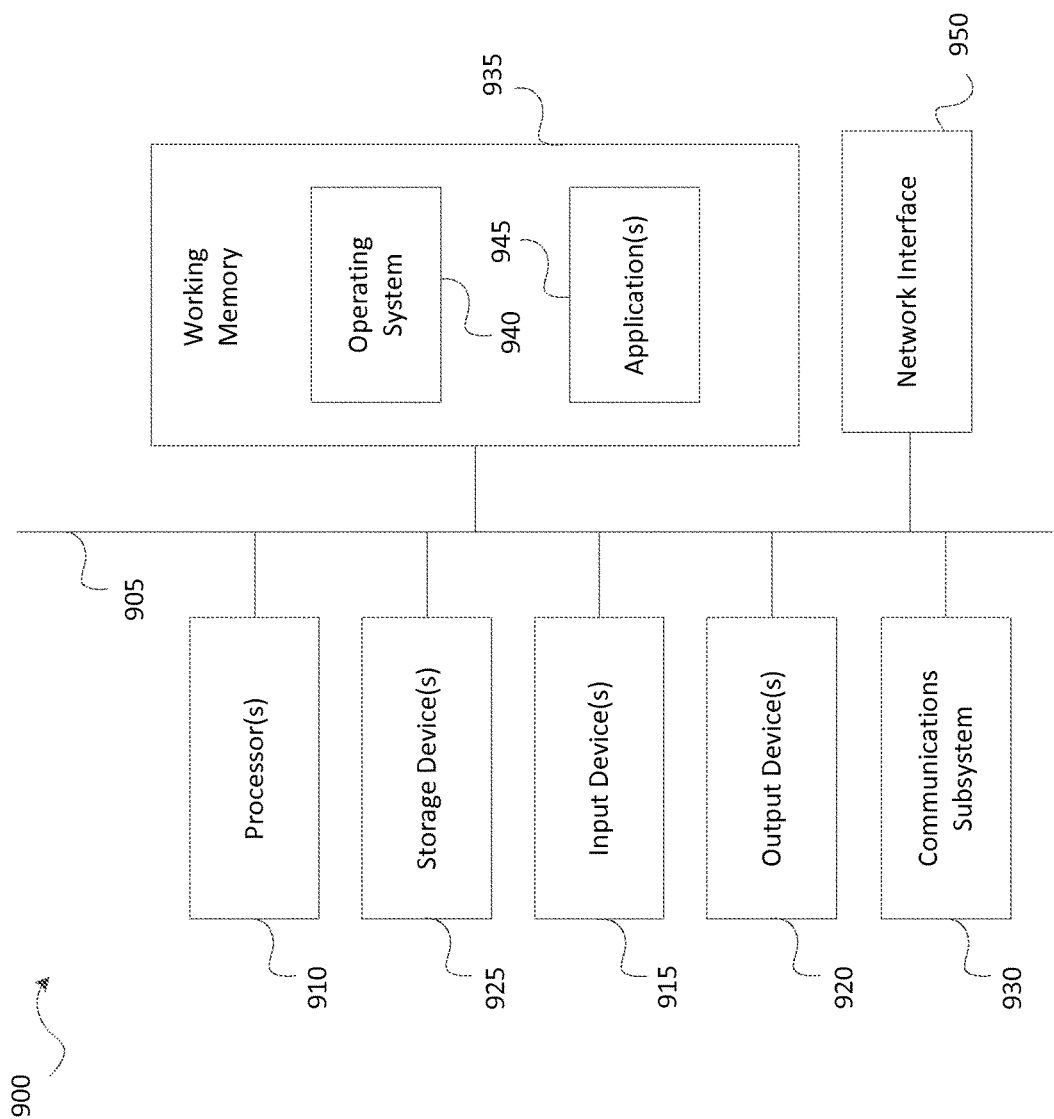
FIG. 9 is a block diagram of components of one embodiment of a computer system for use in transferring UBP information.

Referring to FIG. 6, with further reference to FIGS. 1-5, a process 600 for providing UBP and civic location information to a PSAP includes the stages shown. The process 600 is, however, an example only and not limiting. The process 600 can be altered, e.g., by having stages added, removed, rearranged, combined, and/or performed concurrently. For example, UBP information may be obtained by a serving network prior to obtaining the civic location information. The UBP and civic location information may be provided to a PSAP in one or more messages. In an embodiment, the process 600 may be executed on one or more computer systems such as depicted in FIG. 9.

At stage 602, a serving core network 204 is configured to obtain a dispatchable civic location for a user equipment (UE) 100. The serving core network 204 may include a location server 206 such as an E-SMLC 308, E-SLP 332, and/or SAS 354 as a means to obtain civic location information (e.g. comprising one or more civic locations) for the UE 100 from a NEAD 212 and obtain a dispatchable civic location from this civic location information (e.g. as described previously in association with FIG. 2). The civic location information may be obtained by the NEAD 212 based on (i) one or more Media Access Control (MAC) addresses and/or other addresses associated with one or more WiFi and/or BT APs visible to UE 100, (ii) Base Station IDs (e.g. eNB or Home eNB cell identities (IDs)) visible to the UE 100, or (iii) other geographic information such as the current location of the UE 100. Access to the NEAD 212 may be supported by an Nq interface. The Nq interface may support a query by the serving core network 204 for civic location information associated with location information such as a current location, or one or more references points visible to the UE 100 (which originated an emergency call).

At stage 604, the serving core network 204 is configured to obtain an uncompensated barometric pressure (UBP) from the UE 100. The pressure sensor 130 in the UE 100 is a means for detecting barometric pressure, and the processor 111 and wireless transceiver 121 are a means for providing the UBP to the serving core network 204. In an example, the UBP information may be included in an LPPe message transferred (e.g. using the LPP/LPPe combined protocol) between the UE 100 and either an (i) E-SLP 332 or (ii) an E-SMLC 308 (e.g. via the MME 304 and the eNB 302 in the case of E-SMLC 308). In another example, the UBP information may be included in a message for (i) LPP (e.g. with the LPP message transferred between the UE 100 and either the E-SLP 332 or the E-SMLC 308, and via the MME 304 and the eNB 302 in the case of E-SMLC 308), (ii) RRC for LTE (e.g. with the RRC message transferred between UE 100 and a serving eNB like eNB 302 with the serving eNB then using an LPPa message to convey the UBP information to an E-SMLC such as E-SMLC 308) or (iii) RRC for UMTS (e.g. with the RRC message transferred between the UE 100 and a serving RNC like RNC 356 and with the serving RNC then using a PCAP message to convey the UBP information to an SAS such as SAS 354).

At stage 606, the location server 206 within the serving core network 204 is configured to combine the UBP with the dispatchable civic location. The E-SMLC 308, E-SLP 332, and/or SAS 354 are a means to combine the UBP with the dispatchable civic location. In one example, the UBP may be included within a civic address (CA) (e.g. that may be part of a PIDF-LO object) using a new CA type (e.g., a CA type defined for UBP or a CA type defined as environmental data or as miscellaneous data), or included in an existing CA type (e.g., type 22 LOC, or type 32 ADDCODE). The civic location or the PIDF-LO (e.g. when a civic location including the UBP is included within a PIDF-LO), including the UBP, may be transferred and processed transparently through intermediate entities, and as far as a gateway 208 to the PSAP (e.g. either a GMLC 306 or LRF 330).

At stage 608, the gateway 208 in the serving core network 204 is configured to provide the combined UBP and dispatchable civic location to a PSAP. The GMLC 306 or the LRF 330 are a means for providing the UBP and the dispatchable civic location to the PSAP. In an example, the civic location and UBP (e.g. which may both be included within a PIDF-LO) are transferred using HELD, MLP or the J-STD-036 E2 protocol to the PSAP (e.g., the i3 PSAP 344 or the legacy PSAP 348). In an alternative embodiment, the gateway 208 in the serving core network 204 is configured to extract the UBP from the dispatchable civic location and provide the UBP separately to a PSAP. In an example, the extracted UBP is transferred to the PSAP using one of HELD, MLP or the J-STD-036 E2 protocol.

Figure 7A:
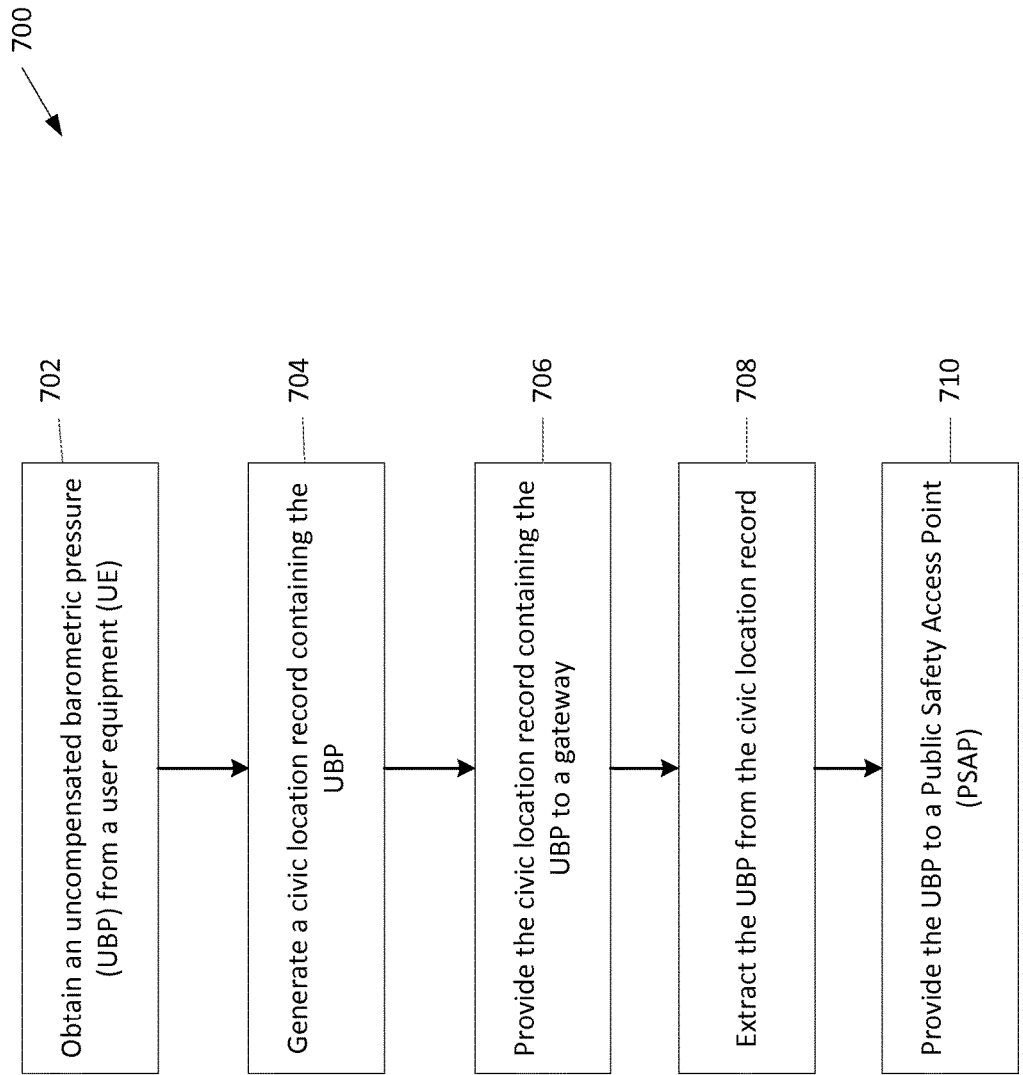
FIG. 7A is a block flow diagram of a process of providing UBP information to a PSAP without the civic information.

Referring to FIG. 7A, with further reference to FIGS. 1-6, a process 700 for providing UBP to a PSAP without civic location information includes the stages shown. The process 700 is, however, an example only and not limiting. The process 700 can be altered, e.g., by having stages added, removed, rearranged, combined, and/or performed concurrently. For example, UBP information may be obtained by a serving network prior to obtaining the civic location information. In an embodiment, the process 700 may be executed on one or more computer systems such as depicted in FIG. 9.

At stage 702, the serving core network 204 is configured to obtain an uncompensated barometric pressure (UBP) from the UE 100. The pressure sensor 130 in the UE 100 is a means for detecting barometric pressure, and the processor 111 and wireless transceiver 121 are a means for providing the UBP to the serving core network 204. In an example, the UBP information may be included in an LPPe message transferred (e.g. using LPP/LPPe) between the UE 100 and either (i) an E-SLP 332 or (ii) an E-SMLC 308 (e.g. via the MME 304 and the eNB 302 in the case of an E-SMLC 308). The location server 206 (e.g., the E-SMLC 308, E-SLP 332, and/or SAS 354) is a means to obtain UBP from the UE 100. In another example, the UBP information may be included in a message for (i) LPP (e.g. with the LPP message transferred between the UE 100 and either the E-SLP 332 or the E-SMLC 308, and via the MME 304 and the eNB 302 in the case of the E-SMLC 308), (ii) RRC for LTE (e.g. with the RRC message transferred between UE 100 and a serving eNB like eNB 302 with the serving eNB then using an LPPa message to convey the UBP information to an E-SMLC such as E-SMLC 308) or (iii) RRC for UMTS (e.g. with the RRC message transferred between the UE 100 and a serving RNC like RNC 356 and with the serving RNC then using a PCAP message to convey the UBP information to an SAS such as SAS 354).

At stage 704, a serving core network 204 is configured to generate a civic location record containing the UBP. In an example, the serving core network 204 may include a location server 206 such as an E-SMLC 308, E-SLP 332, or SAS 354 as a means to receive civic location information (e.g. one or more civic locations) from the NEAD 212 for UE 100 as previously described and obtain a dispatchable civic location for UE 100 from this civic location information. The UBP may be included as a field in a new CA type (e.g., as environmental data, as miscellaneous data or specifically as UBP), or included in an existing civic address type (e.g., type 22 LOC, or type 32 ADDCODE). In some embodiments, the dispatchable civic location containing the UBP may be included within a PIDF-LO object. In another example, if a dispatchable civic location is not obtained, the location server 206 may be configured to construct an empty civic location record which contains only the UBP.

At stage 706, the location server 206 is configured to provide the civic location record containing the UBP to a gateway 208. In an embodiment, the civic location record (containing the UBP) may be part of a PIDF-LO. In an example, the location server 206 (e.g., E-SMLC 308, E-SLP 332, and/or SAS 354) may utilize the existing interfaces and their associated existing protocols (e.g., one or more of the 3GPP SLs, SLg, L0, Lg, Lgd, Iupc, Iu-cs, Iu-ps interfaces) to provide the civic location record containing the UBP (or the PIDF-LO) to the gateway 208 (e.g., the GMLC 306 or LRF 330). Since the UBP information is embedded within the civic location record (which may be futher embedded within a PIDF-LO), the UBP may be transferred and processed transparently through intermediate entities.

At stage 708, the gateway 208 in the serving core network 204 is configured to extract the UBP from the civic location record. The GMLC 306 and/or the LRF 330 are example means for extracting the UBP from the civic location record. Extracting the UBP may be the reverse of the process as described at stage 704. For example, a new CA type containing the UBP, or an existing civic address type containing the UBP may be determined with the UBP extracted by the gateway 208 from this CA type. If a dispatchable civic location was not obtained as part of 704, the gateway 208 may be configured to extract the UBP from an empty civic location record (i.e., empty but for the UBP data).

At stage 710, the gateway 208 in the serving core network 204 is configured to provide the UBP location to a PSAP (e.g. legacy PSAP 348 or i3 PSAP 344). The GMLC 306 or the LRF 330 are a means for providing the UBP to the PSAP. The gateway 208 (e.g. GMLC 306 or LRF 330) in the serving core network 204 provides the UBP from the received civic location record to the PSAP (e.g. using a new parameter for HELD, MLP or the J-STD-036 E2 protocol). The civic location information may be provided in the same message as the UBP or in one or more separate messages.

Figure 7B:
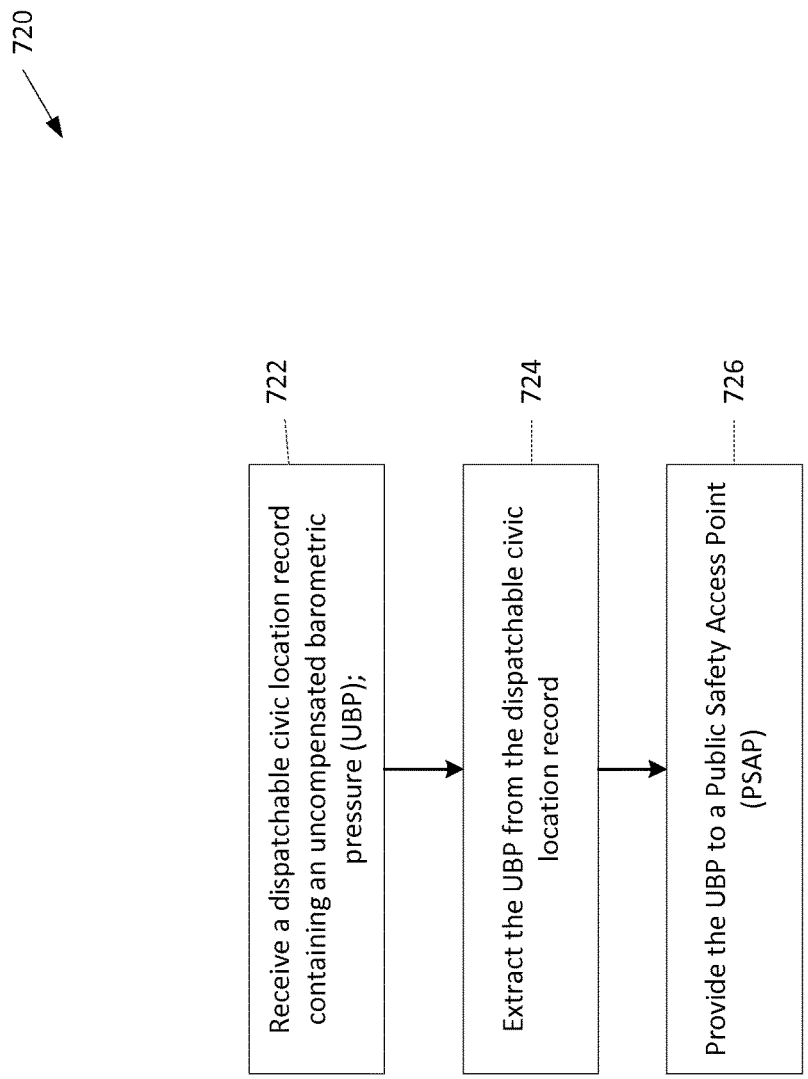
FIG. 7B is a block flow diagram of a process of providing UBP information to a PSAP with a gateway.

Referring to FIG. 7B, with further reference to FIGS. 1-7A, a process 720 for providing UBP to a PSAP with a gateway 208 includes the stages shown. The process 720 is, however, an example only and not limiting. The process 720 can be altered, e.g., by having stages added, removed, rearranged, combined, and/or performed concurrently. In an embodiment, the process 720 may be executed on a computer system such as depicted in FIG. 9.

At stage 722, the gateway 208 is configured to receive a dispatchable civic location record containing an uncompensated barometric pressure (UBP). In an example, the location server 206 (e.g., E-SMLC 308, E-SLP 332, and/or SAS 354) may utilize the existing interfaces and their associated existing protocols (e.g., one or more of the 3GPP SLs, SLg, L0, Lg, Lgd, Iupc, Iu-cs, Iu-ps interfaces) to provide the civic location record containing the UBP to the gateway 208 (e.g., the GMLC 306 or LRF 330). The civic location record may be part of a PIDF-LO. The embedded UBP information may be transferred and processed transparently through intermediate entities.

At stage 724, the gateway 208 is configured to extract the UBP from the dispatchable civic location record. The GMLC 306 and/or the LRF 330 are example means for extracting the UBP from the dispatchable civic location record. Extracting the UBP may include, for example, identifying a new CA type, or identifying an existing civic address type and extracting the UBP from information for this CA type. The gateway 208 may be configured to extract the UBP from an empty civic location record (i.e., empty but for the UBP data).

At stage 726, the gateway 208 is configured to provide the UBP to a PSAP (e.g. legacy PSAP 348 or i3 PSAP 344). The GMLC 306 or the LRF 330 are a means for providing the UBP to the PSAP. The gateway 208 (e.g. GMLC 306 or LRF 330) in the serving core network 204 provides the UBP from the received civic location record (i.e., without the civic location information) to the PSAP (e.g. using a new parameter for HELD, MLP or the J-SRD-036 E2 protocol). The civic location information may be provided in the same message as the UBP or in one or more separate messages.

In an embodiment, the gateway 208 does not extract the UBP from the dispatchable civic location record at stage 724 but instead transfers the UBP, still contained within the civic location record, to the PSAP at stage 726.

Figure 7C:
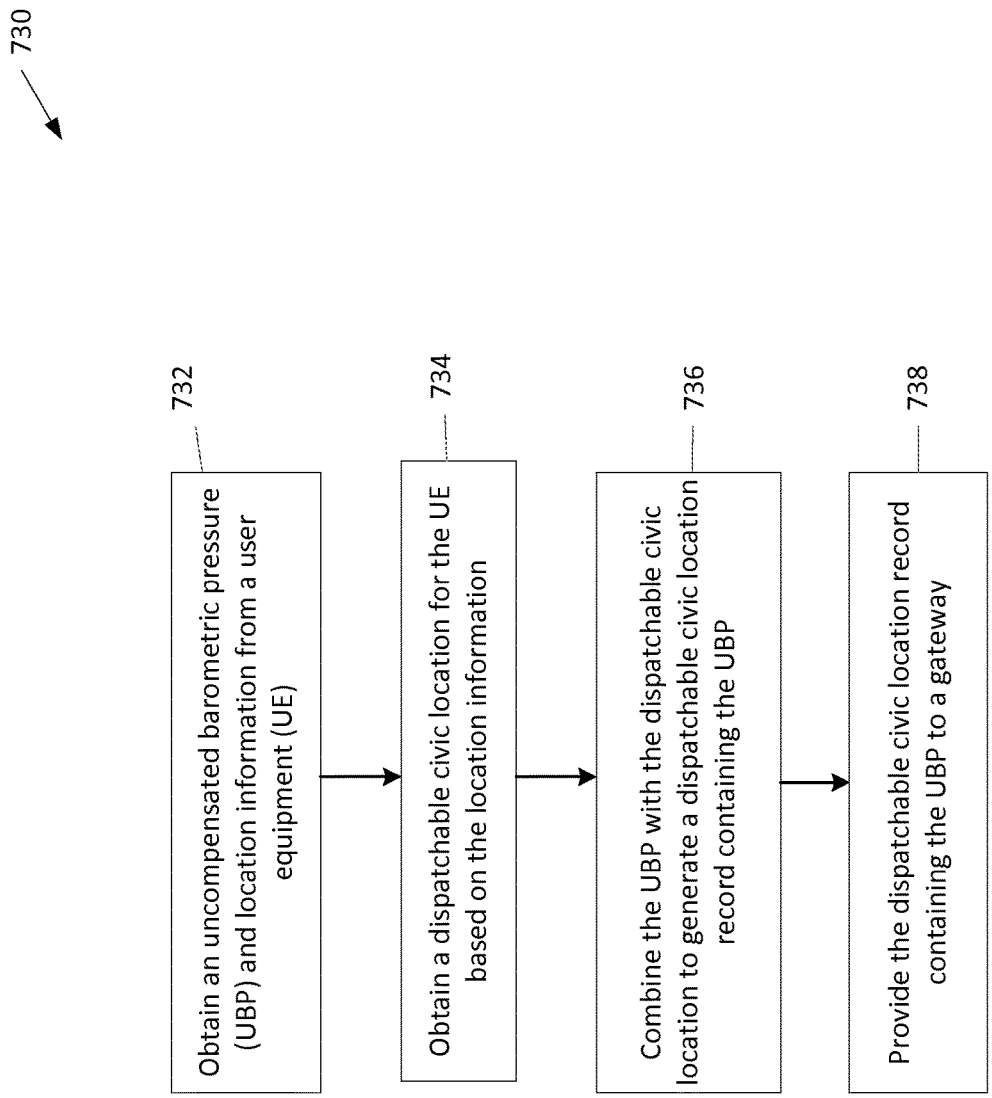
FIG. 7C is a block flow diagram of a process of providing a dispatchable civic location record containing UBP to a gateway.

Referring to FIG. 7C, with further reference to FIGS. 1-6, a process 730 for providing a dispatchable civic location record containing UBP to a gateway includes the stages shown. The process 730 is, however, an example only and not limiting. The process 730 can be altered, e.g., by having stages added, removed, rearranged, combined, and/or performed concurrently. In an embodiment, the process 730 may be executed on a computer system such as depicted in FIG. 9.

At stage 732, the location server 206 in a serving core network 204 is configured to obtain an uncompensated barometric pressure (UBP) and location information from the UE 100. The pressure sensor 130 in the UE 100 is a means for detecting barometric pressure, and the processor 111 and wireless transceiver 121 are a means for providing the UBP and the location information to the serving core network 204. The location information may comprise one or more MAC addresses for each of one or more WiFi and/or BT APs visible to the UE 100. In an example, the UBP and the location information may be included in one or more LPPe messages transferred (e.g. using LPP/LPPe) between the UE 100 and either an E-SLP 332 or an E-SMLC 308 (e.g. via the MME 304 and the eNB 302 in the case of E-SMLC 308). The location server 206 (e.g., the E-SMLC 308, E-SLP 332, and/or SAS 354) is a means to obtain UBP and location information from the UE 100. In another example, the UBP and the location information may be included in a message for (i) LPP (e.g. with the LPP message transferred between the UE 100 and either the E-SLP 332 or the E-SMLC 308 and via the MME 304 and the eNB 302 in the case of E-SMLC 308), (ii) RRC for LTE (e.g. with the RRC message transferred between UE 100 and a serving eNB like eNB 302 with the serving eNB then using an LPPa message to convey the UBP and location information to an E-SMLC such as E-SMLC 308) or (iii) RRC for UMTS (e.g. with the RRC message transferred between the UE 100 and a serving RNC like RNC 356 and with the serving RNC then using a PCAP message to convey the UBP and location information to an SAS such as SAS 354).

At stage 734 the location server 206 is configured to obtain a dispatchable civic location for the UE based on the location information obtained at stage 732. For example, the location information obtained at stage 732 may include the identities (e.g. MAC addresses) of one or more WiFi and/or BT APs in the WLAN 390 visible to UE 100. The location server 206 may provide the NEAD 212 with the AP identities (e.g. MAC addresses). NEAD 212 may then search a database of known WLAN APs for which corresponding civic location information (e.g. a city, street address and/or building designation, floor level and possibly room or apartment number) was previously configured (e.g. via external data sources 216 and NEAM 214) and may return to location server 206 one or more civic locations corresponding to each of one or more of the provided AP identities. The location server 206 may then obtain a dispatchable civic location (e.g. using one of the civic locations returned by the NEAD 212) as described previously in association with FIG. 2. In an example, the location server 206 such as an E-SMLC 308, E-SLP 332, and/or SAS 354 is a means to obtain a dispatchable civic location.

At stage 736, the location server 206 is configured to combine the UBP with the dispatchable civic location obtained at stage 734 to generate a dispatchable civic location record containing the UBP. The UBP may be included as a field in a new CA type (e.g., as environmental data, as miscellaneous data or specifically as UBP), or included in an existing civic address type (e.g., type 22 LOC, or type 32 ADDCODE). In another example, if a dispatchable civic location is not obtained at stage 734, the location server 206 may be configured to construct an empty civic location record at stage 736 which contains only the UBP. In an embodiment, the dispatchable civic location record (containing the UBP) may be included as part of a PIDF-LO.

At stage 738, the location server 206 is configured to provide the civic location record containing the UBP to a gateway 208. In an embodiment, the civic location record (containing the UBP) may be provided as part of a PIDF-LO. In an example, the location server 206 (e.g., E-SMLC 308, E-SLP 332, and/or SAS 354) may utilize the existing interfaces and associated existing protocols (e.g., one or more of the 3GPP SLs, SLg, L0, Lg, Lgd, Iupc, Iu-cs, Iu-ps interfaces) to provide the civic location record containing the UBP to the gateway 208 (e.g., the GMLC 306 or LRF 330). Since the UBP information is embedded within the civic location record (which may be further embedded within a PDIF-LO), the UBP may be transferred and processed transparently through intermediate entities.

As described earlier, a UBP may be included within a PIDF-LO using a new or existing parameter or field for a PIDF-LO. In this case, the UBP may be included within a PIDF-LO but may not be contained or embedded within a dispatchable civic location. Instead, the PIDF-LO may contain the UBP (e.g. using a new or existing parameter or new or existing field for the PIDF-LO) and may in some cases also contain a dispatchable civic location and/or a geographic location for a UE 100, but where the UBP is part of the PIDF-LO but separate from the dispatchable civic location and/or geographic location. In this case, the processes 600, 700, 720 and 730 described previously may be used by a serving core network 204 to provide a UBP to a PSAP such as i3 PSAP 344 or legacy PSAP 348 with certain changes. These changes to the processes 600, 700, 720 and 730 are described next with process stages that are not indicated as being changed being used as described previously. In the case of process 600, (i) stage 602 is performed only as an option; (ii) the UBP obtained at stage 604 (e.g. by location server 206) is combined with a PIDF-LO at stage 606 (e.g. by location server 206) with the PIDF-LO also containing any dispatchable civic location obtained at stage 602 if stage 602 occurs; and (iii) the UBP and PIDF-LO are provided to the PSAP at stage 608 (e.g. by the gateway 208). In the case of process 700, (i) a PIDF-LO instead of or in addition to a civic location record is generated at stage 704 (e.g. by location server 206) with the PIDF-LO containing the UBP (and any civic location record that was generated); (ii) the PIDF-LO generated at stage 704 is provided (e.g. by location server 206) to a gateway 208 at stage 706; and (iii) the gateway 208 extracts the UBP from the PIDF-LO at stage 708. In the case of process 720, (i) a PIDF-LO containing a UBP is received at stage 722 by a gateway 208; and (ii) the UBP is extracted from the PIDF-LO at stage 724 by the gateway 208. In the case of process 730, (i) stage 734 is optional and may not always occur; (ii) at stage 736, the UBP obtained at stage 732 is combined (e.g. by location server 206) with a PIDF-LO (which may also contain any dispatchable civic location obtained at stage 734 if stage 734 occurs); and (iii) at stage 738, the PIDF-LO containing the UBP is provided (e.g. by location server 206) to a gateway (e.g. gateway 208).

Figure 8:
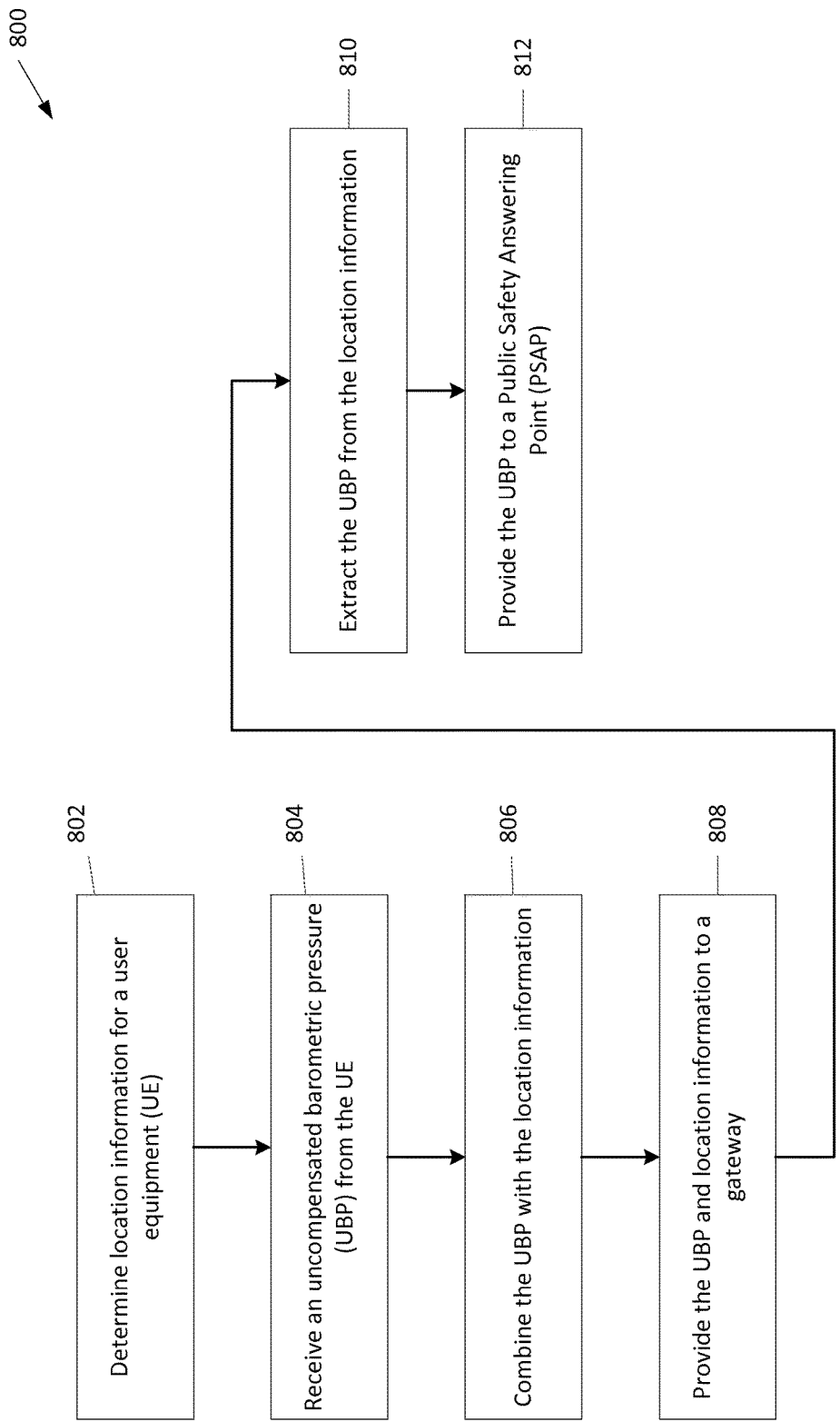
FIG. 8 is a block flow diagram of a process for providing UBP to a PSAP via location information messaging.

Referring to FIG. 8, with further reference to FIGS. 1-5, a process 800 for providing UBP to a PSAP via location information messaging includes the stages shown. The process 800 is, however, an example only and not limiting. The process 800 can be altered, e.g., by having stages added, removed, rearranged, combined, and/or performed concurrently. For example, UBP information may be received by a serving network prior to, at the same time as or after determining or receiving location information for a UE. In an embodiment, the process 800 may be executed on one or more computer systems such as depicted in FIG. 9.

At stage 802, the UE 100 and/or location server 206 in the serving core network 204 are configured to determine location information for the UE 100. In an example, the SPS receiver 155 on the UE 100 processes, in whole or in part, the SPS signals 159 and uses these SPS signals 159 to determine the location of the UE 100. The processor 111, memory 140, DSP 112 and/or specialized processor(s) (not shown) may also be utilized to process the SPS signals 159, in whole or in part, and/or to calculate the location of the UE 100, in conjunction with SPS receiver 155. The location server 206 may be used to perform at least part of the location calculation. The UE 100 may also estimate its current position within an associated system using various techniques, based on other communication entities within view and/or information available to the UE 100. The UE 100 may estimate its position using information obtained from access points (APs) associated with one or more wireless local area networks (WLANs), personal area networks (PANs) utilizing a short-range wireless communication technology such as BLUETOOTH or ZIGBEE®, etc., and/or map constraint data obtained from the location server 206.

At stage 804, the serving core network 204 (e.g. the location server 206) is configured to receive an uncompensated barometric pressure (UBP) from the UE 100. The pressure sensor 130 in the UE 100 is a means for detecting barometric pressure, and the processor 111 and wireless transceiver 121 are a means for providing the UBP to the serving core network 204. In an example, the UBP information may be included in an LPPe message transferred (e.g. using LPP/LPPe) between the UE 100 and either an E-SLP 332 or an E-SMLC 308 (via the MME 304 and the eNB 302 in the case of E-SMLC 308). The location server 206 (e.g., the E-SMLC 308, E-SLP 332, and/or SAS 354) is a means to receive UBP from the UE 100. In another example, the UBP information may be included in a message for (i) LPP (e.g. with the LPP message transferred between the UE 100 and either the E-SLP 332 or the E-SMLC 308 (via the MME 304 and the eNB 302 in the case of E-SMLC 308)), (ii) RRC for LTE (e.g. with the RRC message transferred between UE 100 and a serving eNB like eNB 302 with the serving eNB then using an LPPa message to convey the UBP information to an E-SMLC such as E-SMLC 308) or (iii) RRC for UMTS (e.g. with the RRC message transferred between the UE 100 and a serving RNC like RNC 356 and with the serving RNC then using a PCAP message to convey the UBP information to an SAS such as SAS 354).

At stage 806, the location server 206 is configured to combine the UBP with the location information. The E-SMLC 308, E-SLP 332, and/or SAS 354 are example means for combining the UBP with the location information. In an example, the location information may comprise a geographic location and may be represented by an octet string defined in 3GPP TS 23.032. To combine UBP into the 3GPP location information, the location server 206 may be configured to concatenate, or otherwise combine, several (e.g. two or three) additional octets (e.g. at the end) of a location information octet string to convey the UBP. Other methods for combining the UBP with existing location information formats may also be used. In an example, parameters associated with standard geographic shapes (e.g. as defined in 3GPP TS 23.032) may be modified to accommodate the UBP information (e.g., ellipsoid points, altitude parameters, and XML formats as described above).

At stage 808, the location server 206 is configured to provide the UBP and location information to the gateway 208. In an example, the location server 206 (e.g., E-SMLC 308, E-SLP 332, and/or SAS 354) may utilize the existing interfaces and associated existing protocols (e.g., one or more of the 3GPP SLs, SLg, L0, Lg, Lgd, Iupc, Iu-cs, Iu-ps interfaces) to provide the UBP and the location information to the gateway 208 (e.g., the GMLC 306 or LRF 330). Since the UBP information is embedded within the location information, the UBP may be processed transparently through intermediate entities.

At stage 810, the gateway 208 in the serving core network 204 is configured to extract the UBP from the location information. The GMLC 306 and/or the LRF 330 are example means for extracting the UBP from the location information. Extracting the UBP may be the reverse of the process as described at stage 806. For example, the gateway 208 may be configured to parse the additional (e.g. two or three) octets from the geographic location string or extract the UBP information from the object formats described above (e.g., ellipsoid points, altitude parameters, and XML tags).

At stage 812, the gateway 208 in the serving core network 204 is configured to provide the UBP location to a PSAP (e.g. legacy PSAP 348 or i3 PSAP 344). The GMLC 306 or the LRF 330 are a means for providing the UBP to the PSAP. The gateway 208 (e.g. GMLC 306 or LRF 330) in the serving core network 204 provides the UBP extracted from the location information to the PSAP (e.g. using a new parameter for HELD, MLP or the J-STD-036 E2 protocol). The location information may be provided in the same message or in one or more separate messages.

It should be noted that in referring to determination of a dispatchable civic location with which a UBP may be combined by a location server (e.g. E-SMLC 308, E-SLP 332 or SAS 354) in the previous description (e.g. as associated with FIGS. 2, 3A, 3B, 4, 6, 7A, 7B, 7C), the use of a NEAD (e.g. NEAD 212) has been described as a means to obtain a civic location and a dispatchable civic location at the location server. However, in another embodiment, a location server 206 may obtain a dispatchable civic location directly from a UE (e.g. UE 100) using a positioning related protocol such as SUPL ULP, LPP/LPPe, RRC for UMTS, RRC for LTE or PCAP. In a further embodiment, a location server 206 (e.g. E-SMLC 308, E-SLP 332 or SAS 354) may obtain a dispatchable civic location from an access network (e.g. eNB 302 or RNC 356 in an access network) or from a WLAN (e.g. from a controller or access point in WLAN 390). In yet another embodiment, a location server 206 (e.g. E-SMLC 308, E-SLP 332 or SAS 354) may obtain a dispatchable civic location for UE 100 from another location server which may in turn obtain the dispatchable civic location from the NEAD 212, from the UE 100 or from an access network or element in an access network (e.g. eNB 302, Node B 352, or RNC 356) or WLAN (e.g. WLAN 390). In another embodiment, a location server 206 (e.g. E-SMLC 308, E-SLP 332 or SAS 354) may determine a dispatchable civic location itself for the UE 100 (e.g. using data configured in the location server) and possibly based on location related information for the UE 100 (e.g. location related measurements and/or a location estimate) received from the UE 100, from an access network for the UE 100 or from a WLAN (e.g. WLAN 390) containing APs nearby to the UE 100 that receive signals from the UE 100. For all of these embodiments, and as described in association with FIGS. 2, 3A, 3B, 4, 6, 7A, 7B and 7C, the location server 206 may combine a UBP measurement received from the UE 100 with the dispatchable civic location for UE 100 and transfer the combined dispatchable civic location and UBP to a gateway 208 for either onward transfer to a PSAP or for the gateway to extract the UBP and send the UBP separately to the PSAP.

Referring to FIG. 9, with further reference to FIGS. 1-8, a computer system 900 may be utilized to transfer UBP information by at least partially implementing the functionality of the elements in FIGS. 3A and 3B. FIG. 9 provides a schematic illustration of one embodiment of a computer system 900 that can perform the methods (e.g. as described in association with FIGS. 2-8) provided by various other embodiments, as described herein, and/or can function as a mobile device (e.g. UE 100) or other computer system. The serving core network 204 may include one or more computer systems 900, such as in location server 206 and the gateway 208. For example, the eNB 302, MME 304, GMLC 306, the E-SMLC 308, the E-SLP 332 (including the SPC 334 and the SLC 336), the SAS 354, the LRF 330, and the other entities in FIGS. 3A and 3B may be comprised of one or more computer systems 900. FIG. 9 provides a generalized illustration of various components, any or all of which may be utilized as appropriate. FIG. 9 therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like. The processor(s) 910 can include, for example, intelligent hardware devices, e.g., a central processing unit (CPU) such as those made by Intel® Corporation or AMD®, a microcontroller, an ASIC, etc. Other processor types could also be utilized.

The computer system 900 may further include (and/or be in communication with) one or more non-transitory storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930 and a network interface 950, which can include without limitation a modem, a network card (wireless or wired), an infrared communication device, a wireless communication device and/or chipset (such as a BLUETOOTH short-range wireless communication technology transceiver/device, an 802.11 device, a WiFi device, a WiMax device, cellular communication facilities, etc.), and/or the like. The network interface 950 may permit data to be exchanged with a network (such as the LTE network described herein, to name one example), other computer systems, and/or any other devices described herein. In many embodiments, the computer system 900 will further comprise, as here, a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

The computer system 900 may be used to perform methods in accordance with the disclosure. Some or all of the procedures of such methods may be performed by the computer system 900 in response to processor 910 executing one or more sequences of one or more instructions (which might be incorporated into the operating system 940 and/or other code, such as an application programs 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the UE 100 and/or the computer system 900, various computer-readable media might be involved in providing instructions/code to processor(s) 111, 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 140, 925. Volatile media include, without limitation, dynamic memory, such as the working memory 140, 935. Transmission media include, without limitation, coaxial cables, copper wire and fiber optics, including the wires that comprise the bus 101, 905, as well as the various components of the communications subsystem 930 (and/or the media by which the communications subsystem 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 111, 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the UE 100 and/or computer system 900. These signals, which might be in the form of electromagnetic signals, acoustic signals, optical signals and/or the like, are all examples of carrier waves on which instructions can be encoded, in accordance with various embodiments.

An example of a non-transitory processor-readable storage medium according to the disclosure includes instructions for providing uncompensated barometric pressure information to a PSAP, the instructions including code for obtaining an uncompensated barometric pressure (UBP) from a user equipment, code for obtaining a dispatchable civic location for the user equipment, code for combining the UBP with the dispatchable civic location, and code for sending the UBP and the dispatchable civic location to the PSAP.

Implementations of such a non-transitory processor-readable storage medium may include one or more of the following features. Code for obtaining the UBP and the dispatchable civic location with a location server. The location server may be one of an Enhanced Serving Mobile Location Center (E-SMLC), an Emergency SUPL Location Platform (E-SLP), or a Standalone Serving Mobile Location Center (SAS). Code for obtaining the UBP from the user equipment may be configured to obtain the UBP via at least one of a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The dispatchable civic location may include a Presence Information Data Format Location Object (PIDF-LO), and the PIDF-LO may be received from a National Emergency Address Database (NEAD). The code for sending the UBP and the dispatchable civic location to the PSAP may include code for providing the UBP and the dispatchable civic location to a gateway via at least one of a 3GPP Iupc, Iu-cs, Iu-ps, SLs, SLg, Lg, Lgd, or L0 interface, and code for providing at least the UBP to the PSAP from the gateway via at least one of a HELD, MLP or J-STD-036 E2 protocol.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

An example of an apparatus for providing uncompensated barometric pressure (UBP) between a user equipment (UE) and a PSAP according to the disclosure includes means for determining a location information for the UE, means for receiving the UBP from the UE, means for combining the UBP with the location information, means for providing the UBP and the location information to a gateway, means for extracting the UBP from the location information, and means for providing the UBP to the PSAP.

Implementations of such an apparatus may include one or more of the following features. The means for receiving the UBP from the UE may include at least one of a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol. The means for providing the UBP and the location information to the gateway may include at least one of a 3GPP SLs, SLg, L0, Lg, Lgd, Iupc, Iu-cs or Iu-ps interface. The means for determining the location information for the UE may include a SPS receiver. The means for providing the UBP to the PSAP includes at least one of a HELD, MLP or J-STD-036 E2 protocol. The means for combining the UBP with the location information may include concatenating a geographic location string with a data field of several (e.g. two or three) additional octets representing the UBP.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). As used herein, the term "and/or" as used in a list of items such as A, B and/or C is equivalent to A or B or C or combinations thereof.

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the various embodiments. Also, a number of steps may be undertaken before, during, or after the above elements are considered. Accordingly, the above description does not bound the scope of the claims.

What is claimed is:

1. A method for providing uncompensated barometric pressure information to a Public Safety Answering Point (PSAP), comprising:
obtaining a dispatchable civic location for a user equipment, wherein the dispatchable civic location comprises a Presence Information Data Format Location Object (PIDF-LO), and wherein obtaining the PIDF-LO comprises querying a database of civic locations;
obtaining an uncompensated barometric pressure (UBP) from the user equipment;
combining the UBP with the dispatchable civic location to generate a dispatchable civic location record containing the UBP;
providing the dispatchable civic location record containing the UBP to a gateway; and
providing at least the UBP to the PSAP from the gateway.

2. The method of claim 1 wherein the UBP and the dispatchable civic location are obtained by a location server.

3. The method of claim 2 wherein the location server is one of an Enhanced Serving Mobile Location Center (E-SMLC), an Emergency Secure Location User Plane Location (SUPL) Location Platform (E-SLP), or a Standalone Serving Mobile Location Center (SAS).

4. The method of claim 3 wherein the UBP is obtained from the user equipment via an OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol or combination thereof.

5. The method of claim 1 wherein the PIDF-LO is obtained from a National Emergency Address Database (NEAD).

6. The method of claim 1 wherein:
providing the dispatchable civic location record containing the UBP to the gateway comprises using a 3GPP Iupc, Iu-cs, Iu-ps, SLs, SLg, Lg, Lgd, or L0 interface or combination thereof; and
providing at least the UBP to the PSAP from the gateway comprises using an HTTP Enabled Location Delivery (HELD) protocol, an OMA Mobile Location Protocol (MLP) or a TIA/ATIS J-STD-036 E2 protocol or combination thereof.

7. The method of claim 1 wherein combining the UBP with the dispatchable civic location includes using a civic address type that is part of the PIDF-LO object.

8. A gateway for providing uncompensated barometric pressure between a user equipment (UE) and a Public Safety Answering Point (PSAP), the gateway comprising:
a network interface configured to receive a dispatchable civic location record containing an uncompensated barometric pressure (UBP), wherein the dispatchable civic location comprises a Presence Information Data Format Location Object (PIDF-LO) obtained from a database of civic locations;
a processor and memory configured to extract the UBP from the dispatchable civic location record; and
the network interface further configured to provide the UBP to the PSAP.

9. The gateway of claim 8 wherein the network interface is configured to provide the UBP to the PSAP via an HTTP Enabled Location Delivery (HELD) protocol, an OMA Mobile Location Protocol (MLP) or a TIA/ATIS J-STD-036 E2 protocol or combination thereof.

10. The gateway of claim 8 wherein the network interface is further configured to provide the dispatchable civic location record to the PSAP.

11. A location server for providing uncompensated barometric pressure for a user equipment (UE) to a gateway, the location server comprising:
a network interface configured to:
obtain an uncompensated barometric pressure (UBP) from the UE;
obtain a dispatchable civic location for the UE, wherein the dispatchable civic location comprises a Presence Information Data Format Location Object (PIDF-LO), and wherein the network interface is configured to obtain the PIDF-LO by querying a database of civic locations;
a processor and a memory configured to combine the UBP with the dispatchable civic location to generate a dispatchable civic location record containing the UBP; and
the network interface further configured to provide the dispatchable civic location record containing the UBP to the gateway.

12. The location server of claim 11 comprising one of an Enhanced Serving Mobile Location Center (E-SMLC), an Emergency Secure User Plane Location (SUPL) Location Platform (E-SLP), or a Standalone Serving Mobile Location Center (SAS).

13. The location server of claim 11 wherein the network interface is configured to provide the dispatchable civic location record containing the UBP to the gateway via a 3GPP SLs, SLg, L0, Lg, Lgd, Iupc, Iu-cs or Iu-ps interface or combination thereof.

14. The location server of claim 11 wherein the UBP is obtained from the UE via a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol, or a 3GPP Positioning Calculation Application Part (PCAP) protocol or combination thereof.

15. A method for providing uncompensated barometric pressure from a user equipment (UE) to a gateway in a Long Term Evolution (LTE) architecture or a Universal Mobile Telecommunication System (UMTS) architecture, the method comprising:
obtaining an uncompensated barometric pressure (UBP) and location information from the UE;
obtaining a dispatchable civic location for the UE based on the location information, wherein the dispatchable civic location comprises a Presence Information Data Format Location Object (PIDF-LO), and wherein obtaining the PIDF-LO comprises querying a database of civic locations;
combining the UBP with the dispatchable civic location to generate a dispatchable civic location record containing the UBP; and
providing the dispatchable civic location record containing the UBP to the gateway.

16. The method of claim 15 wherein the UBP and the dispatchable civic location are obtained at one of an Enhanced Serving Mobile Location Center (E-SMLC), an Emergency Secure User Plane Location (SUPL) Location Platform (E-SLP), or a Standalone Serving Mobile Location Center (SAS).

17. The method of claim 15 wherein providing the dispatchable civic location record containing the UBP to the gateway comprises:
providing the dispatchable civic location record containing the UBP via a 3GPP SLs, SLg, L0, Lg, Lgd, Iupc, Iu-cs or Iu-ps interface or combination thereof.

18. The method of claim 15 wherein obtaining the dispatchable civic location comprises generating an empty civic location record.

19. The method of claim 18 further comprising:
combining the empty civic location record and the UBP; and
providing the empty civic location record containing UBP to the gateway.

20. The method of claim 15 wherein the UBP and the location information are obtained from the UE via a OMA LTE Positioning Protocol Extensions (LPPe) protocol, a 3GPP LTE Positioning Protocol (LPP), a 3GPP Radio Resource Control (RRC) protocol for LTE, a 3GPP RRC protocol for UMTS, a 3GPP LTE Positioning Protocol A (LPPa) protocol or a 3GPP Positioning Calculation Application Part (PCAP) protocol or combination thereof.

21. The method of claim 15 wherein the gateway receives the dispatchable civic location record containing the UBP,
extracts the UBP from the dispatchable civic location record and
provides the UBP to a Public Safety Answering Point (PSAP).

22. The method of claim 21 wherein the gateway provides the UBP to the PSAP via an HTTP Enabled Location Delivery (HELD) protocol, an OMA Mobile Location Protocol (MLP) or a TIA/ATIS J-STD-036 E2 protocol or combination thereof.

23. The method of claim 21, wherein the gateway provides the dispatchable civic location record to the PSAP.

* * * * *